(12) United States Patent
Nakaishi

(10) Patent No.: US 10,448,047 B2
(45) Date of Patent: Oct. 15, 2019

(54) ENCODER CIRCUIT AND ENCODING METHOD

(71) Applicant: SOCIONEXT INC., Yokohama-shi, Kanagawa (JP)

(72) Inventor: Hidenori Nakaishi, Nara (JP)

(73) Assignee: Socionext, Inc., Yokohama (JP)

( * ) Notice: Subject to any disclaimer, the term of this patent is extended or adjusted under 35 U.S.C. 154(b) by 583 days.

(21) Appl. No.: 14/834,294

(22) Filed: Aug. 24, 2015

(65) Prior Publication Data

US 2016/0065985 A1 Mar. 3, 2016

(30) Foreign Application Priority Data

Sep. 1, 2014 (JP) ................................. 2014-177385

(51) Int. Cl.
*H04B 1/66* (2006.01)
*H04N 19/533* (2014.01)
(Continued)

(52) U.S. Cl.
CPC ........... *H04N 19/533* (2014.11); *H04N 19/56* (2014.11); *H04N 19/57* (2014.11)

(58) Field of Classification Search
CPC .... H04N 19/107; H04N 19/61; H04N 19/176; H04N 19/537; H04N 19/523; H04N 19/533; H04N 19/59; H04N 19/63
(Continued)

(56) References Cited

U.S. PATENT DOCUMENTS 5,821,986 A * 10/1998 Yuan ........................ H04N 7/15
  348/14.12
6,137,837 A * 10/2000 Nemiroff ............... H04N 19/51
  348/416.1
(Continued)

FOREIGN PATENT DOCUMENTS

JP H9-182077 A 7/1997
JP H11-122618 A 4/1999
(Continued)

OTHER PUBLICATIONS

Japanese Office Action of related Japanese Patent Application No. 2014-177385 dated Jun. 5, 2018 (with partial English translation).

*Primary Examiner* — Jamie J Atala
*Assistant Examiner* — Masum Billah
(74) *Attorney, Agent, or Firm* — Arent Fox LLP

(57) ABSTRACT

An encoder circuit includes a reduction circuit, a statistical processing circuit, a first motion search circuit, and a second motion search circuit. The reduction circuit generates reduced images of multiple patterns with respect to each of macroblocks. Each of frame images included in video is divided into the macroblocks. The statistical processing circuit performs statistical processing on motion vectors detected with respect to each of the macroblocks. The first motion search circuit selects one of the reduced images generated with respect to the frame image of a reference frame, based on the result of the statistical processing, and searches a first search range in the selected one of the reduced images so as to detect a first motion vector. The second motion search circuit searches a second search range set in the reference frame based on the first motion vector so as to detect a second motion vector.

10 Claims, 21 Drawing Sheets

(51) Int. Cl.
*H04N 19/56* (2014.01)
*H04N 19/57* (2014.01)

(58) Field of Classification Search
USPC .......................................... 375/240
See application file for complete search history.

(56) References Cited

U.S. PATENT DOCUMENTS

| | | | | |
|---|---|---|---|---|
| 2005/0163389 A1* | 7/2005 | Ohmi | ................... | G06T 9/008 |
| | | | | 382/253 |
| 2006/0188024 A1 | 8/2006 | Suzuki et al. | | |
| 2008/0123904 A1* | 5/2008 | Sakamoto | ............ | H04N 19/176 |
| | | | | 382/107 |
| 2008/0175439 A1* | 7/2008 | Kurata | ............... | H04N 5/23248 |
| | | | | 382/107 |

FOREIGN PATENT DOCUMENTS

| | | | |
|---|---|---|---|
| JP | 2006-14343 A | | 1/2006 |
| JP | 2007-158855 A | | 6/2007 |
| JP | 2007158855 A | * | 6/2007 |
| JP | 2007158855 A | * | 6/2007 |
| JP | 2011-055554 A | | 3/2011 |
| JP | 2011205212 A | * | 10/2011 |
| WO | WO 2006/004667 A2 | | 1/2006 |

\* cited by examiner

FIG.16D
| 0,14 | 2,14 | 4,14 | 6,14 | 8,14 | 10,14 | 12,14 | 14,14 |
| 0,12 | 2,12 | 4,12 | 6,12 | 8,12 | 10,12 | 12,12 | 14,10 |
| 0,10 | 2,10 | 4,10 | 6,10 | 8,10 | 10,10 | 12,10 | 14,10 |
| 0,8 | 2,8 | 4,8 | 6,8 | 8,8 | 10,8 | 12,8 | 14,8 |
| 0,6 | 2,6 | 4,6 | 6,6 | 8,6 | 10,6 | 12,6 | 14,6 |
| 0,4 | 2,4 | 4,4 | 6,4 | 8,4 | 10,4 | 12,4 | 14,4 |
| 0,2 | 2,2 | 4,2 | 6,2 | 8,2 | 10,2 | 12,2 | 14,2 |
| 0,0 | 2,0 | 4,0 | 6,0 | 8,0 | 10,0 | 12,0 | 14,0 |
SMB
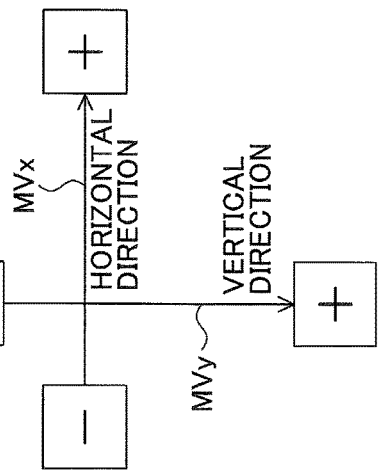
FIG.16B
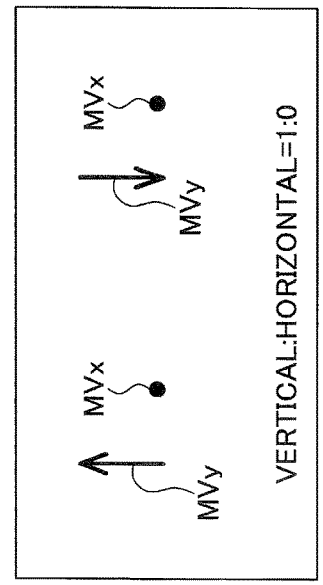
FIG.16C

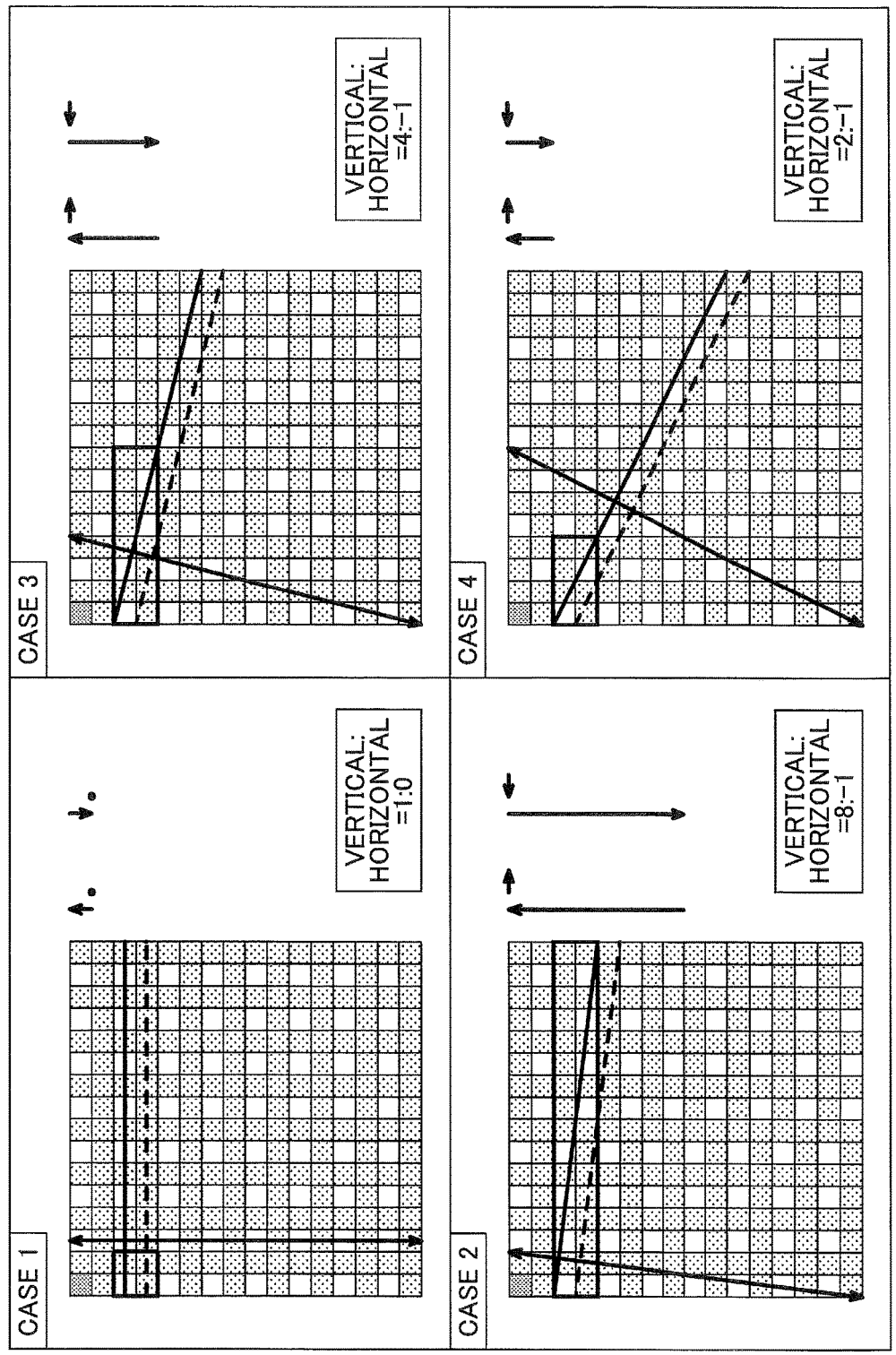

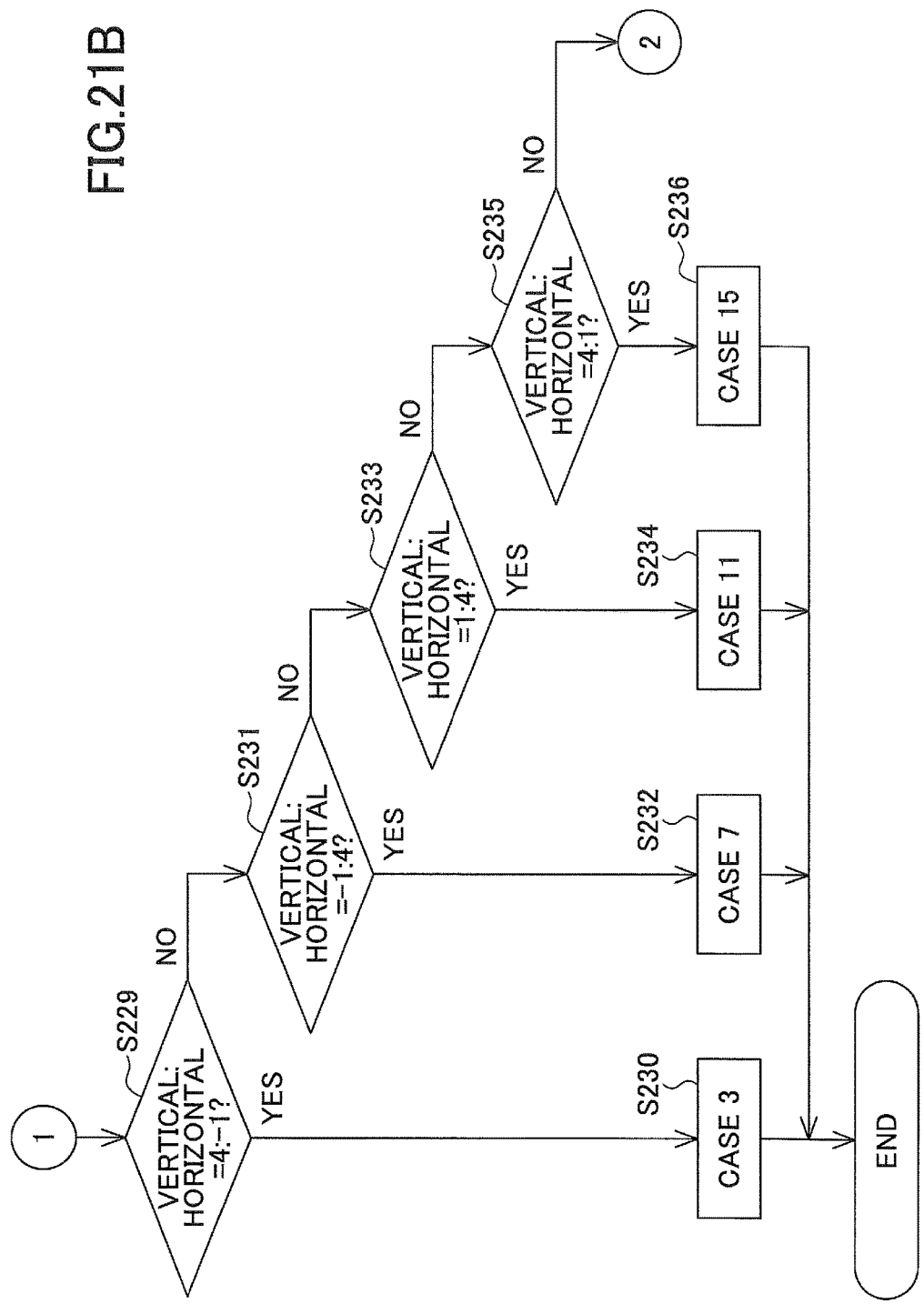

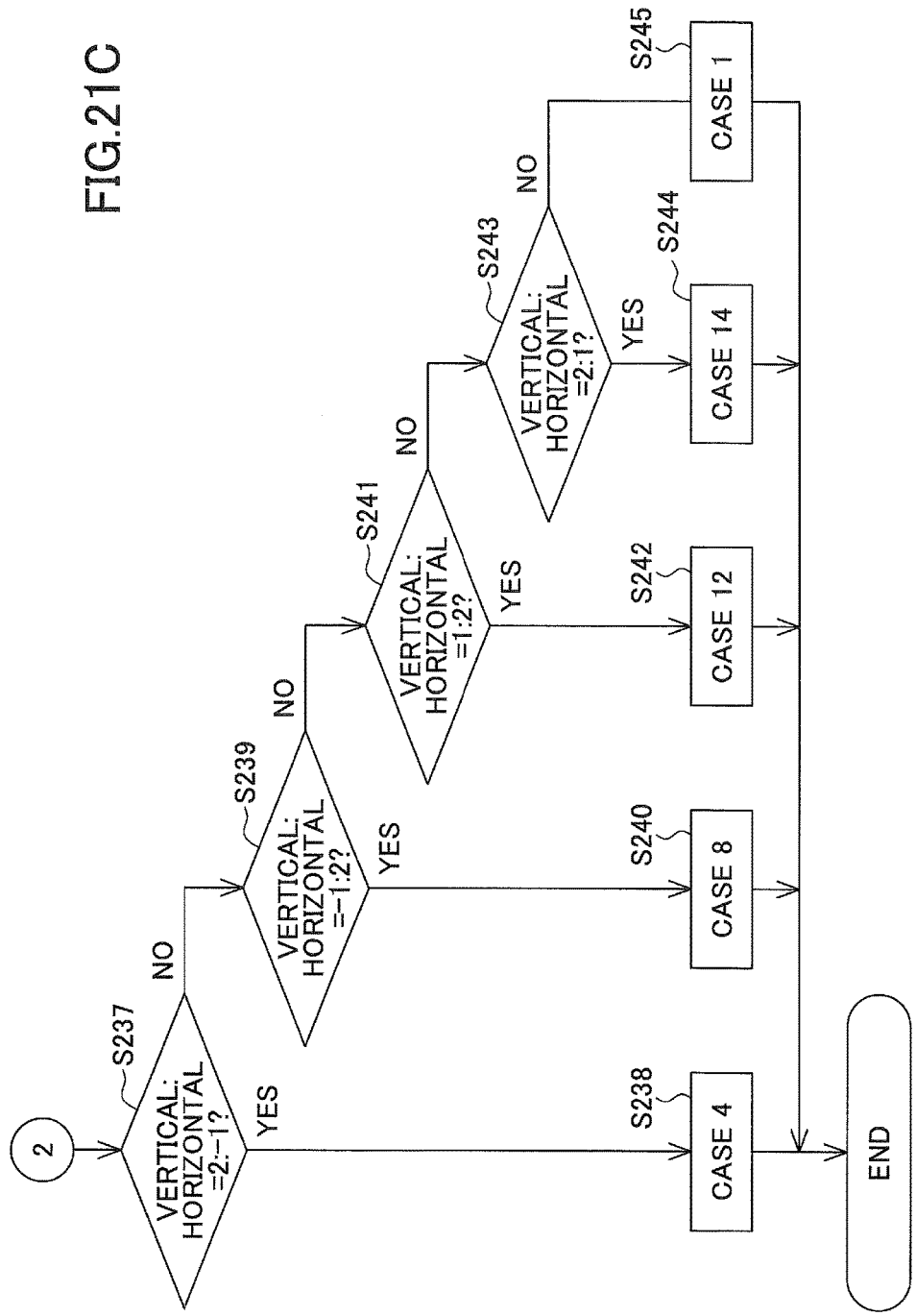

ENCODER CIRCUIT AND ENCODING METHOD

CROSS-REFERENCE TO RELATED APPLICATION

This application is based upon and claims the benefit of priority of the prior Japanese Patent Application No. 2014-177385, filed on Sep. 1, 2014, the entire contents of which are incorporated herein by reference.

FIELD

A certain aspect of the embodiment discussed herein is related to video encoder circuits and encoding methods.

BACKGROUND

Standards such as MPEG (Moving Picture Experts Group) and H.264 have been known as standards for video compression coding. Image processing apparatuses that perform such compression coding perform intra prediction and inter prediction. According to the intra prediction, a motion search is performed so as to detect motion vectors of macroblocks (MBs) into which a screen to be encoded (referred to as "currently processed image") is divided. The motion search is a process to search out a block similar to a macroblock that is a target of processing from a reference image that is temporally previous or subsequent to the currently processed image. A reduced image may be employed in the motion search. (See, for example, Japanese Laid-Open Patent Publication Nos. 2007-158855 and 2011-055554.) Pixels are uniformly reduced along the horizontal direction and the vertical direction of the currently processed image and the reference image. For example, even-numbered pixels are eliminated to generate a reduced image. A motion search is performed using this reduced image, and based on its results, the search range of the motion search is determined in the currently processed image and the reference image.

SUMMARY

According to an aspect of the invention, an encoder circuit includes a reduction circuit, a statistical processing circuit, a first motion search circuit, and a second motion search circuit. The reduction circuit generates reduced images of multiple patterns with respect to each of macroblocks. Each of frame images included in video is divided into the macroblocks. The statistical processing circuit performs statistical processing on motion vectors detected with respect to each of the macroblocks. The first motion search circuit selects one of the reduced images generated with respect to the frame image of a reference frame, based on the result of the statistical processing, and searches a first search range in the selected one of the reduced images so as to detect a first motion vector. The second motion search circuit searches a second search range set in the reference frame based on the first motion vector so as to detect a second motion vector.

The object and advantages of the invention will be realized and attained by means of the elements and combinations particularly pointed out in the claims.

It is to be understood that both the foregoing general description and the following detailed description are exemplary and explanatory and not restrictive of the invention.

BRIEF DESCRIPTION OF THE DRAWINGS

FIG. 6 is a diagram illustrating order macroblocks are processed and calculation of a motion vector predictor and so on;

FIGS. 16A through 16D are diagrams illustrating a process of creating a reduced image;

FIG. 17 is a diagram illustrating reduced image patterns;

FIGS. 21A through 21C are flowcharts illustrating a process of selecting a reduced image pattern.

DESCRIPTION OF EMBODIMENTS

Encoders that encode video are required to detect a block that is more similar to a macroblock that is a target of processing in a motion search in order to improve coding efficiency (the efficiency of encoding by inter prediction). For this purpose, the search range is desired to be wide. A wider search range, however, increases time for a search, thus causing a decrease in processing efficiency.

According to an aspect of the invention, it is possible to improve coding efficiency.

One or more preferred embodiments of the present invention will be explained with reference to accompanying drawings.

First, a description is given of an outline of an encoder.

Figure 1:
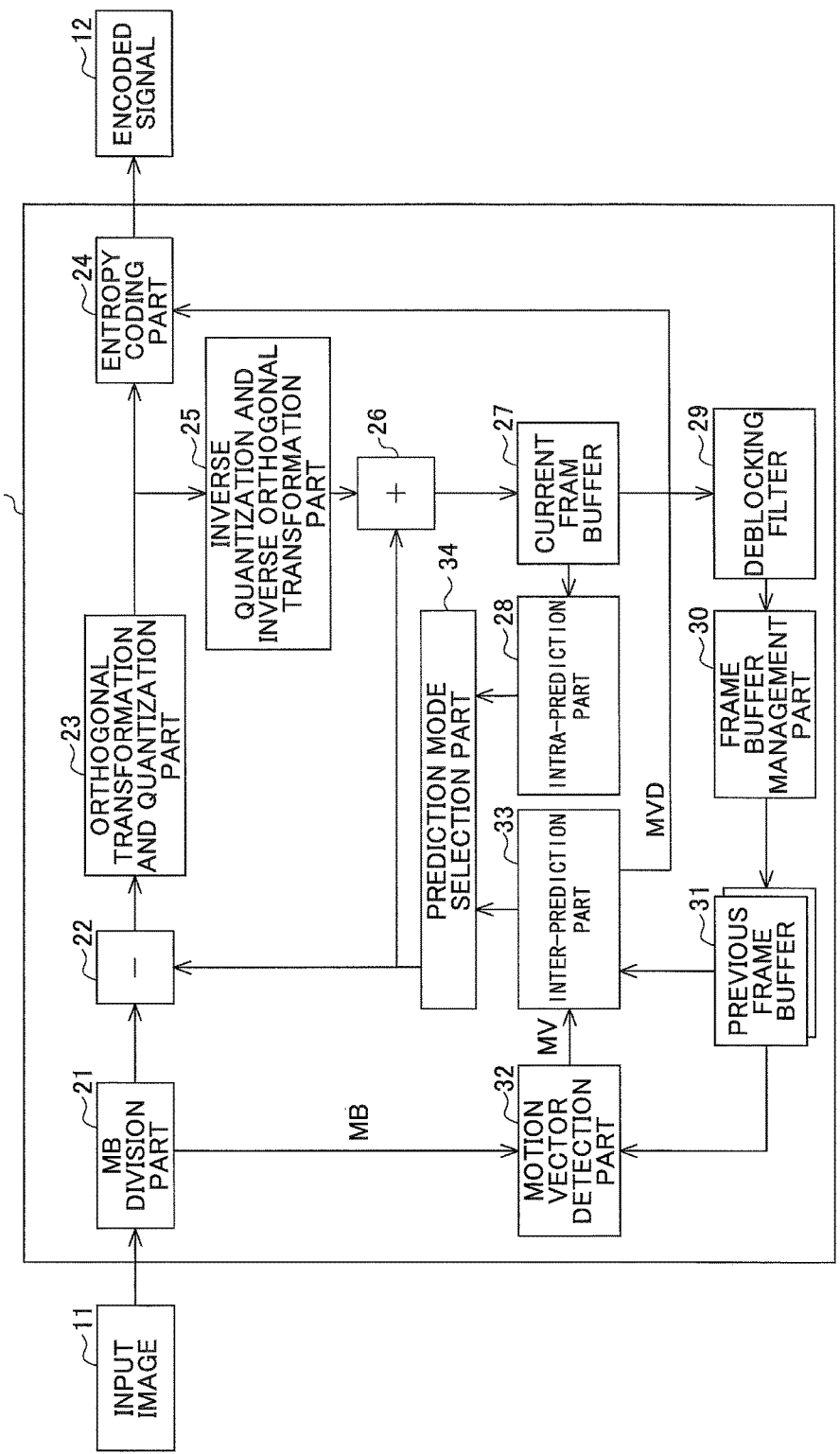
FIG. 1 is a schematic diagram illustrating an encoder.

FIG. 1 is a schematic diagram illustrating an encoder according to an embodiment. An encoder 10 illustrated in FIG. 1 is an encoder circuit that generates an encoded signal 12 into which an input signal 11 is encoded, in accordance with, for example, the MPEG-2 standard. Each part of the encoder is, for example, a circuit constituting a part of the encoder circuit.

The macroblock division part (MB division part) 21 outputs an image in which the input image 11 is divided into process units (macroblocks [MBs]) to a subtractor 22 and a motion vector detection part 32.

The subtractor 22 calculates a difference between each macroblock and a predicted image output from a prediction mode selection part 34, and outputs the difference (difference value). An orthogonal transformation and quantization part 23 performs an orthogonal transformation and thereafter quantization on the difference value so as to output quantized data. The orthogonal transformation is, for example, a discrete cosine transform (DCT). An entropy coding part 24 performs variable-length coding on the data quantized by the orthogonal transformation and quantization part 23 so as to output the encoded signal 12.

An inverse quantization and inverse orthogonal transformation part 25 performs inverse quantization and thereafter an inverse orthogonal transformation on the data quantized by the orthogonal transformation and quantization part 23 so as to output processed data. The inverse orthogonal transformation is, for example, an inverse DCT (IDCT). An adder 26 adds the predicted image output from the prediction mode selection part 34 to the output data of the inverse quantization and inverse orthogonal transformation part 25 so as to generate a reference image. The reference image is retained in a current frame buffer 27.

An intra-prediction part 28, to which the reference image retained in the current frame buffer 27 is input, performs intra prediction on the reference image based on pixel levels from neighboring blocks. A deblocking filter 29, to which the reference image retained in the current frame buffer 27 is input, performs smoothing of the boundary between two neighboring macroblocks on and outputs the input reference image. As a result, the deblocking filter 29 reduces block distortion that is generated at the time of image coding. A frame buffer management part 30 outputs the output data of the deblocking filter 29 to a previous frame buffer 31, and the previous frame buffer 31 stores the output data.

The motion vector detection part 32 detects the motion vector (MV) of a current (target) macroblock Cu using the macroblocks input from the MB division part 21 and the reference image stored in the previous frame buffer 31. The motion vector is normally highly correlated with a surrounding area. An inter-prediction part 33 calculates a motion vector predictor MVP based on the motion vectors of surrounding areas. Furthermore, the inter-frame prediction part 33 calculates the motion vector difference MVD between the motion vector and the motion vector predictor MVP. The entropy coding part 24 outputs the encoded signal 12 that includes the motion vector difference MVD (prediction difference). A decoder (not graphically illustrated) calculates the motion vector based on the motion vector difference MVD so as to generate a decoded output image.

The prediction mode selection part 34 compares the prediction errors of the inter-prediction part 33 and the intra-prediction part 28, selects a coding mode capable of encoding the instant macroblock with most efficiency, and generates coding mode information. The coding mode information is passed to the entropy coding part 24 as encoding target information. The encoding target information includes the size of divisional macroblocks into which a macroblock is divided, and the size of sub-macroblocks into which a divisional macroblock is further divided.

Figure 2:
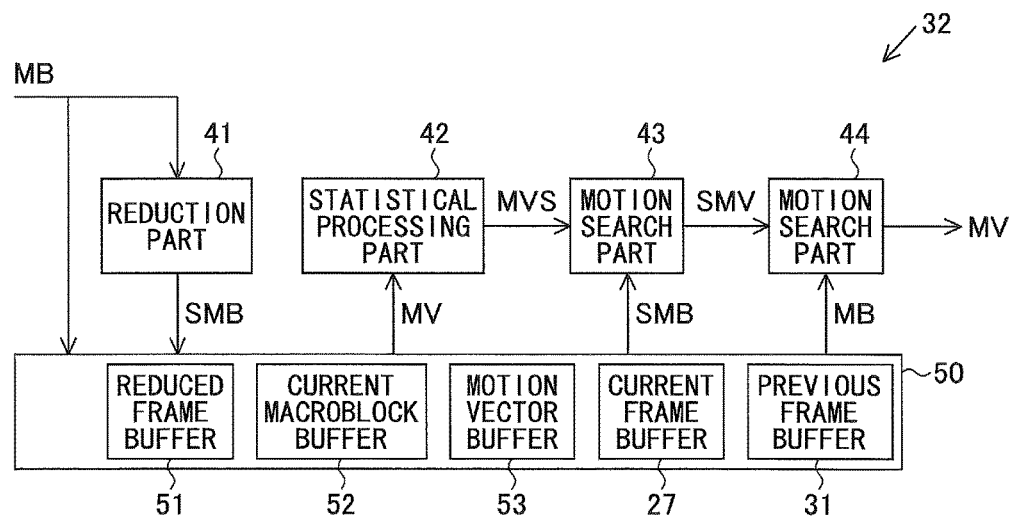
FIG. 2 is a block diagram illustrating a motion vector detection part of the encoder.

FIG. 2 is a block diagram illustrating the motion vector detection part 32. Referring to FIG. 2, the motion vector detection part 32 includes a reduction part 41, a statistical processing part 42, and motion search parts 43 and 44.

The reduction part 41 generates a reduced-size macroblock (SMB) to which a macroblock is reduced at a predetermined reduction ratio. The reduction part 41 generates the reduced-size macroblock by reducing the pixels of the macroblock. The reduction ratio is, for example, 50% (½) in each of a horizontal direction and a vertical direction. The reduction part 41 generates multiple reduced-size macroblocks that differ in pattern.

Multiple patterns are determined based on the motion vector of a macroblock. For example, a pattern is determined so as to reduce pixels along a line determined in accordance with the motion vector. The reduction part 41 generates multiple reduced-size macroblocks by reducing pixels in accordance with multiple patterns. A description is given below of patterns (the positions of pixels to be eliminated) of a reduced-size macroblock. The reduced-size macroblocks thus generated include pixels according to the direction of the motion vector. The reduction part 41 stores the generated reduced-size macroblocks in a reduced frame buffer 51 of a memory 50.

The reduction part 41 reduces macroblocks, which are units of processing into which a frame image is divided, in size one after another, and stores the reduced-size macroblocks in the reduced frame buffer 51. Accordingly, the reduced images of each frame image are stored in the reduced frame buffer 51. That is, with respect to the currently processed image, the reduced-size macroblocks of the current macroblock Cu and the reduced-size macroblocks of a macroblock that has been processed before the current macroblock Cu are stored. Furthermore, the reduced images of reference frames that have been captured at different times than and processed before the currently processed image are stored in the reduced frame buffer 51. The reference frames include backward reference frames (previous frames) captured before (earlier than) the currently processed image and forward reference frames (subsequent or future frames) captured after (later than) the currently processed image.

In the memory 50, the reduced frame buffer 51, a current macroblock buffer 52, and a motion vector buffer 53 are defined as storage areas. Furthermore, storage areas such as the current frame buffer 27 and the previous frame buffer 31 illustrated in FIG. 1 are defined in the memory 50. The memory 50 may be a memory module of an SDRAM (synchronous dynamic random access memory) or the like. Such a memory module is connected to, for example, a semiconductor device (LSI) including the functional parts of the encoder 10.

The statistical processing part 42 generates pattern selection information for selecting one of the reduced images of multiple patterns created in the reduction part 41. For example, the statistical processing part 42 reads previous motion vectors from the motion vector buffer 53 of the memory 50 based on the position information of a macroblock that is a target of processing, and generates the pattern selection information based on the motion vectors. The pattern selection information is, for example, a statistical motion vector MVS obtained by performing statistical processing on the motion vectors.

For example, the statistical processing part 42 reads the motion vectors of the neighboring macroblocks of a macroblock that is a target of processing in the currently processed image from the motion vector buffer 53. Then, the statistical processing part 42 performs statistical processing on the read motion vectors so as to generate the pattern selection information. The statistical processing is, for example, averaging. For example, the statistical processing part 42 calculates the average of the motion vectors already generated in the currently processed image, and determines the average as the pattern selection information (statistical motion vector MVS).

Furthermore, when there is a reference image subsequent to the currently processed image, the statistical processing part 42 reads the motion vectors of the reference image from the motion vector buffer 53. For example, the statistical processing part 42 reads the motion vector of a macroblock at the same position in the reference image as the macroblock that is a target of processing (hereinafter, "reference macroblock") and the motion vectors of the surrounding macroblocks of the reference macroblock in the reference image from the motion vector buffer 53. Then, the statistical processing part 42 performs statistical processing on the motion vectors of the currently processed image and the motion vectors of the reference image so as to generate the pattern selection information. The statistical processing is, for example, averaging. For example, the statistical processing part 42 calculates the average of the motion vectors already generated in the currently processed image and the previously generated motion vectors of the reference image, and determines the average as the pattern selection information (statistical motion vector MVS).

The motion search part 43 selects one of the multiple reduced-size macroblocks stored in the reduced frame buffer 51 in correspondence to the current macroblock Cu based on the pattern selection information (statistical motion vector MVS). Furthermore, the motion search part 43 selects a reduced reference image corresponding to the pattern selection information (statistical motion vector MVS). That is, the motion search part 43 selects reduced images of a single pattern corresponding to the pattern selection information. Then, the motion search part 43 reads the selected reduced-size macroblock and reduced reference image. Then, the motion search part 43 searches the reduced reference image using the reduced-size macroblock so as to detect the motion vector SMV of the reduced-size macroblock. Then, the motion search part 43 outputs the motion vector SMV to the motion search part 44.

For example, the motion search part 43 determines pixels included in the same range as the reduced-size macroblock in a set search range as a candidate block. The motion search part 43 compares the values of the pixels included in the reduced-size macroblock and the values of the pixels included in each candidate block so as to calculate an evaluation value. The evaluation value is, for example, a sum of absolute differences (SAD). Alternatively, a sum of squared differences (SSD), a sum of absolute transformed differences (SATD) or the like may be used as the evaluation value.

Then, the motion search part 43 detects a candidate block whose evaluation value is the smallest. Then, the motion search part 43 calculates a displacement from a macroblock (virtual macroblock) spatially at the same position as the current macroblock to the detected candidate block in the reference image. The motion search part 43 calculates the displacement based on the position of the detected candidate block and the position of the virtual macroblock. This displacement is the motion vector SMV of the current macroblock in the reduced image. The motion vector SMV is data (information) that indicate the position (shift and shift direction) of the candidate block relative to the current macroblock Cu.

Thus, in the motion search part 43, because a reduced image is used for a motion search, the amount of operation is greatly reduced, so that the efficiency of the motion search is improved.

Furthermore, the motion search part 43 selects one of multiple patterns based on the processing result (statistical motion vector MVS) in the statistical processing part 42, and detects the motion vector SMV using the reduced images (reduced-size macroblock and reduced reference image) of the selected pattern. The reduced image of the selected pattern includes pixels corresponding to the pattern selection information (statistical motion vector MVS). Accordingly, compared with the case of using a reduced image that is uniformly reduced in directions of pixel arrangement (a vertical direction and a horizontal direction), it is possible to detect a candidate block that is closer to the current macroblock Cu. That is, it is possible to detect the motion vector SMV with high accuracy.

The motion search part 44 performs a motion search in a search range that corresponds to the motion vector SMV input from the motion search part 43, with respect to each macroblock that serves as the unit of processing of the motion search. Because the motion vector SMV is a motion vector searched out based on a reduced image, the motion vector SMV is used with values (size) increased in accordance with the reduction ratio. For example, the reduction part 41 generates a reduced image whose pixels are reduced by half in a horizontal direction and a vertical direction, and the motion search part 43 performs a motion search using the reduced image. Accordingly, the motion search part 44 uses the motion vector SMV by doubling the horizontal and vertical values expressed by the motion vector SMV.

The motion search part 44 uses part of a decoded image stored in the previous frame buffer 31 as a reference image.

The motion search part 44 determines, as a search center, a position offset in accordance with the motion vector SMV from a reference point (for example, the center) of a reference macroblock at a position equal to the current macroblock Cu in the reference image. For example, it is assumed that the horizontal and vertical values of the motion vector SMV are Vx and Vy, respectively. In this case, relative to the coordinates of the reference point (Px, Py.), the coordinates of the search center (Sx, Sy) are given by:

$Sx=Px+2Vx$, and $Sy=Py+2Vy$.

Then, the search range is determined based on this search center. The size of the search range is determined so as to include, for example, pixels of a number corresponding to the size of a macroblock. For example, the size of the search range is determined so as to include ±XA pixels in a horizontal direction and ±YA pixels in a vertical direction relative to the macroblock.

Like the motion search part 43, the motion search part 44 performs a motion search in the search range thus positioned. That is, the motion search part 44 determines, as a candidate block, pixels included in the same range as the macroblock in the set search range. The motion search part 44 compares the values of the pixels included in the macroblock and the values of the pixels included in each candidate block so as to calculate an evaluation value. The evaluation value is, for example, an SAD. Alternatively, an SSD or SATD may be used as the evaluation value. Then, the motion search part 44 detects a candidate block whose evaluation value is the smallest. Then, the motion search part 44 calculates a displacement (motion vector) from a macroblock (virtual macroblock) spatially at the same position as the current macroblock Cu to the detected candidate block in the reference image.

In the motion search part 44, a search range is determined (offset) in the reference image in accordance with the motion vector SMV detected in the motion search part 43. The motion search part 43 detects the motion vector SMV using reduced images of a pattern corresponding to the pattern selection information (statistical motion vector MVS) calculated from the motion vectors of the current macroblock Cu and its surrounding macroblocks alone or in combination with the motion vectors of a virtual macroblock and its surrounding macroblocks in a subsequent reference image. It is often the case that the motion of the current macroblock Cu is highly correlated with the motions of its surrounding macroblocks. Accordingly, by using reduced images of a pattern corresponding to the motion vector of the current macroblock Cu, using the pattern selection information (statistical motion vector MVS) obtained by performing statistical processing on motion vectors in surrounding macroblocks, it is possible to detect the motion vector SMV with high accuracy. Furthermore, by using the motion vector SMV, it is possible to set a search range corresponding to the motion vector SMV of the current macroblock Cu in a reference image, so that it is possible to efficiently detect the motion vector MV of the current macroblock. Furthermore, it is possible to accurately detect the motion vector MV.

A description is given of types of pictures and reference relationships.

Figure 3:
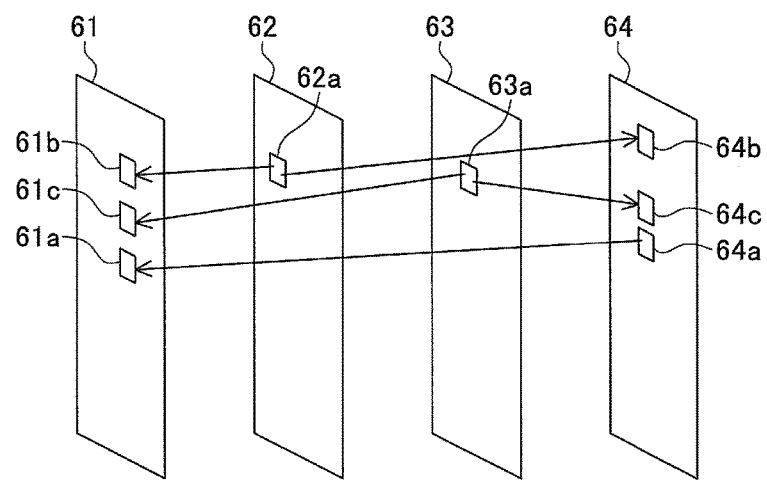
FIG. 3 is a diagram illustrating pictures to be encoded.

FIG. 3 is a diagram illustrating pictures to be encoded. Referring to FIG. 3, four images (pictures) 61, 62, 63 and 64 are captured in this order. The picture 61 is, for example, an I-picture and is encoded by intra prediction.

The picture 64 is a P-picture. A macroblock 64a included in the picture 64 is equal or similar to a macroblock 61a included in the picture 61. In the encoding of the picture 64, a motion vector search using the picture 61 as a reference image (backward reference) is performed so as to encode reference information in the macroblock 64a.

The picture 62 is a B-picture. A macroblock 62a included in the picture 62 is equal or similar to a macroblock 61b included in the previous picture 61. Furthermore, the macroblock 62a is equal or similar to a macroblock 64 included in the subsequent or future picture 64. In the encoding of the picture 62, a motion vector search using the picture 61 and the picture 64 as reference images (forward reference, backward reference, and bi-directional reference) is performed so as to encode reference information in the macroblock 62a.

The picture 63 is a B-picture. A macroblock 63a included in the picture 63 is equal or similar to a macroblock 61c included in the preceding picture 61. Furthermore, the macroblock 63a is equal or similar to a macroblock 64c included in the subsequent picture 64. In the encoding of the picture 63, a motion vector search using the picture 61 and the picture 64 as reference images (forward reference, backward reference, and bi-directional reference) is performed so as to encode reference information in the macroblock 63a.

Next, a description is given of a reference image and a macroblock in a P-picture.

Figure 4:
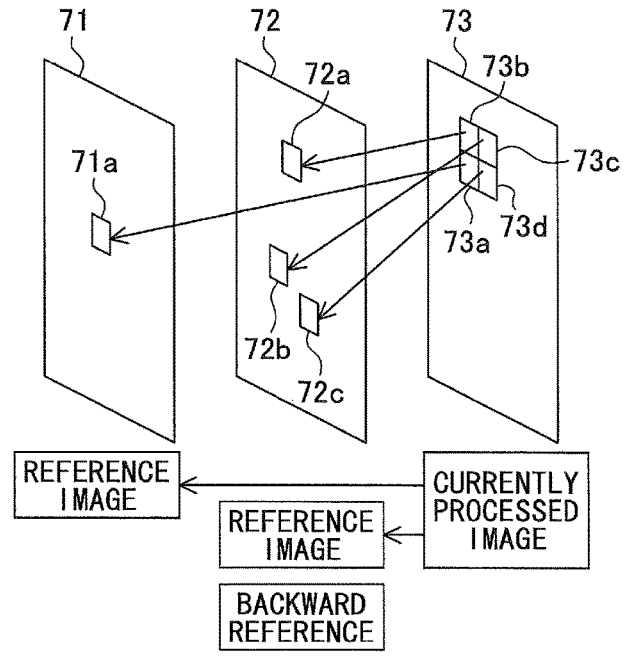
FIG. 4 is a diagram illustrating inter-picture backward reference.

FIG. 4 is a diagram illustrating inter-picture backward reference. Referring to FIG. 4, three images (pictures) 71, 72 and 73 are captured in this order. The currently processed image 73 includes four macroblocks 73a, 73b, 73c and 73d. The currently processed image 73 is a P-picture. The macroblock 73a is equal or similar to a macroblock 71a of the previous reference image 71 (earlier than the currently processed image 73 in temporal order). The reference image 71 is an I-picture or a P-picture, and has been encoded before the currently processed image 73. Accordingly, in the currently processed image 73, a difference from information indicating the macroblock 71a included in the reference image 71 is encoded.

The macroblock 73b of the currently processed image 73 is equal or similar to a macroblock 72a of the previous reference image 72. The reference image 72 is an I-picture or a P-picture, and has been encoded before the currently processed image 73. Accordingly, in the currently processed image 73, a difference from information indicating the macroblock 72a included in the reference image 72 is encoded.

Likewise, the macroblocks 73c and 73d of the currently processed image 73 are equal or similar to macroblocks 72b and 72c, respectively, of the previous reference image 72. In the currently processed image 73, a difference from information indicating the macroblocks 72b and 72c included in the previous reference image 72 is encoded.

Next, a description is given of a reference image and a macroblock in a B-picture.

Figure 5:
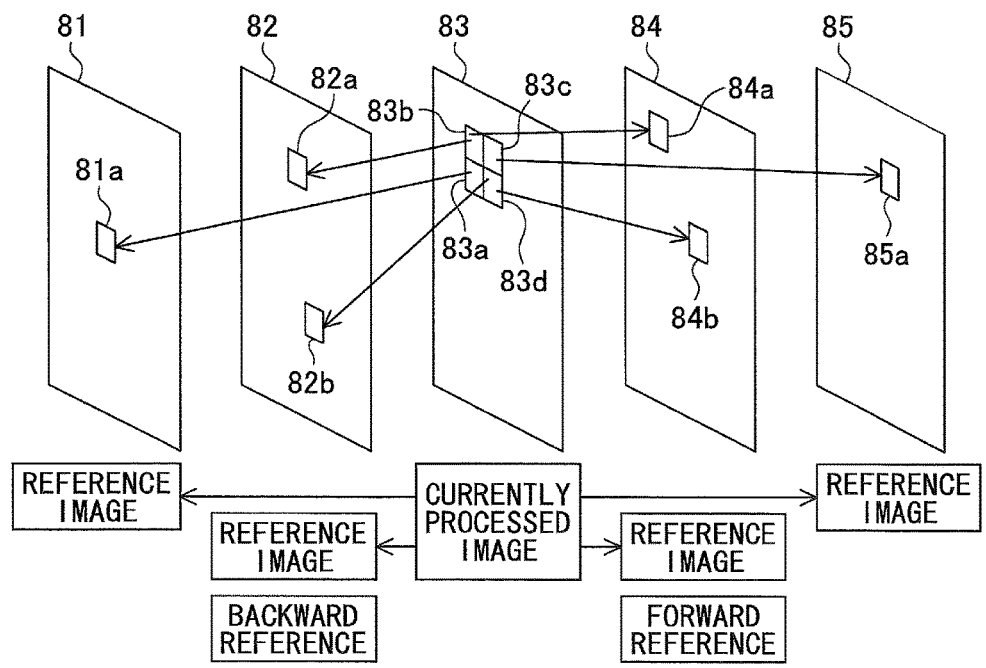
FIG. 5 is a diagram illustrating inter-picture forward reference and backward reference.

FIG. 5 is a diagram illustrating inter-picture forward reference and backward reference. Referring to FIG. 5, five images (pictures) 81, 82, 83, 84 and 85 are captured in this order. The currently processed image 83 includes four macroblocks 83a, 83b, 83c and 83d. The currently processed image 83 is a B-picture. The macroblock 83a is equal or similar to a macroblock 81a of the previous reference image 81 (earlier than the currently processed image 83 in temporal order). The reference image 81 is an I-picture or a P-picture, and has been encoded before the currently processed image 83. Accordingly, in the currently processed image 83, a difference from information indicating the macroblock 81a included in the reference image 81 is encoded.

The macroblock 83b of the currently processed image 83 is equal or similar to a macroblock 82a of the previous reference image 82. Furthermore, the macroblock 83b is equal or similar to a macroblock 84a of the subsequent (future) reference image 84 (later than the currently processed image 83 in temporal order). The reference image 84 is an I-picture or a P-picture, and has been encoded before the currently processed image 83. Accordingly, in the currently processed image 83, a difference from information indicating the macroblocks 82a and 84a included in the reference images 82 and 84, respectively, is encoded.

The macroblock 83c of the currently processed image 83 is equal or similar to a macroblock 85a of the subsequent reference image 85. The reference image 85 is an I-picture or a P-picture, and has been encoded before the currently processed image 83. Accordingly, in the currently processed image 83, a difference from information indicating the macroblock 85a included in the reference image 85 is encoded.

The macroblock 83d of the currently processed image 83 is equal or similar to a macroblock 82b of the previous reference image 82. Furthermore, the macroblock 83d is equal or similar to a macroblock 84b of the subsequent reference image 84. Accordingly, in the currently processed image 83, a difference from information indicating the macroblocks 82b and 84b included in the reference images 82 and 84, respectively, is encoded.

Next, a description is given of the order of processing and the process of calculating the motion vector predictor MVP and the motion vector difference MVD in a picture.

Figure 6:
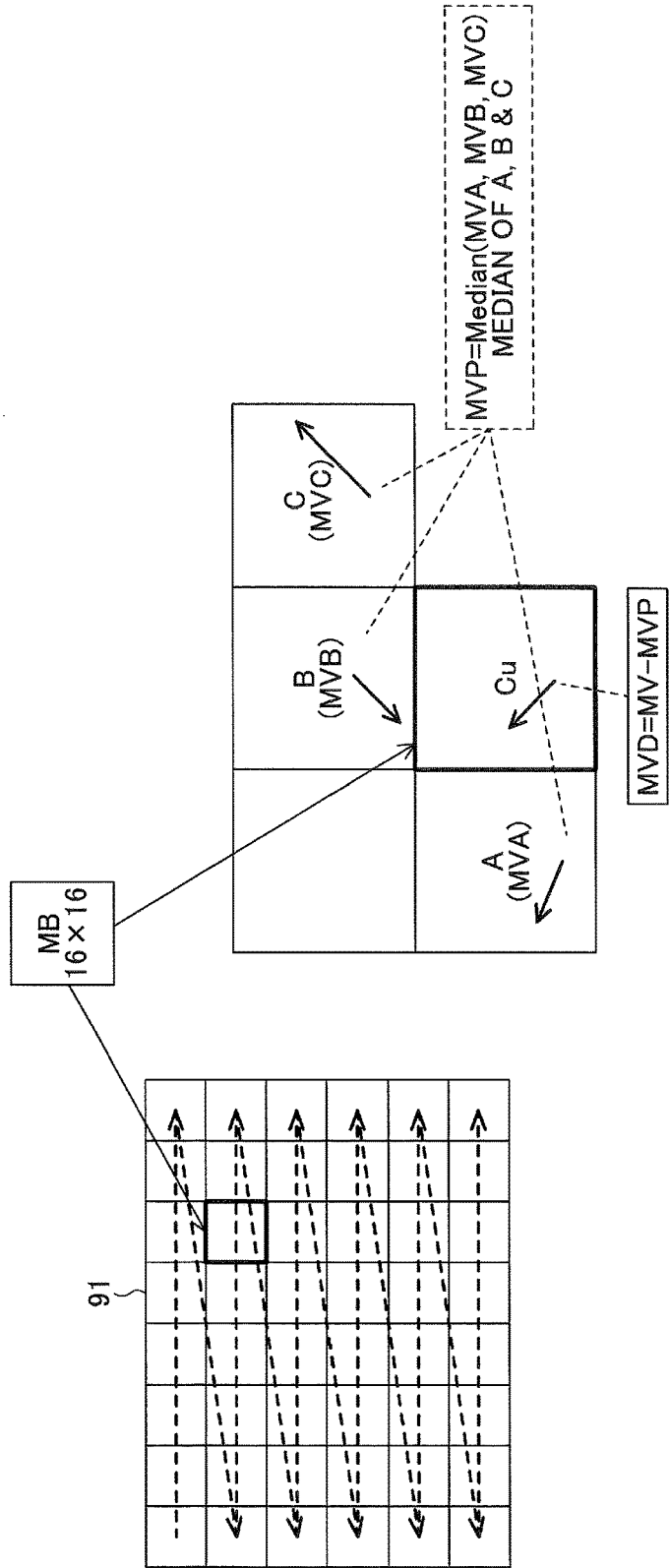

FIG. 6 is a diagram illustrating order macroblocks are processed and calculation of the motion vector predictor MVP and so on. Referring to FIG. 6, a single picture (frame) 91 includes multiple (8×6) macroblocks arranged in a matrix. Each macroblock is a pixel matrix of, for example, 16 pixels in a horizontal direction and 16 pixels in a vertical direction.

As indicated by broken arrows in FIG. 6, coding is performed with respect to each set (line) of macroblocks arranged in a raster scan direction. That is, the macroblocks of the topmost line are first encoded in order from the left-end macroblock to the right-end macroblock. Next, the macroblocks at the second line from the top are encoded in order from the left-end macroblock to the right-end macroblock. Thereafter, the encoding of macroblocks in order from the left-end macroblock to the right-end macroblock is repeated line by line until the macroblocks of the bottom-most line are encoded.

In FIG. 6, a macroblock that is a target of processing (current macroblock) is indicated by "Cu". The motion vector predictor MVP is calculated based on the motion vectors MVA, MVB and MVC of the surrounding macroblocks "A," "B" and "C" of the current macroblock Cu. The motion vector predictor MVP is the median of the motion vectors MVA, MVB and MVC of the surrounding macroblocks "A," "B" and "C." That is, the motion vector predictor MVP is calculated by MVP=Median (MVA, MVB, MVC). The "Median" is an arithmetic operator that returns a median. Then, the motion vector difference MVD is calculated, based on the motion vector MV of the current macroblock Cu and the motion vector predictor MVP, by:

MVD=MV−MVP.

Next, an overview is given of the motion vector search.

Figure 7A:
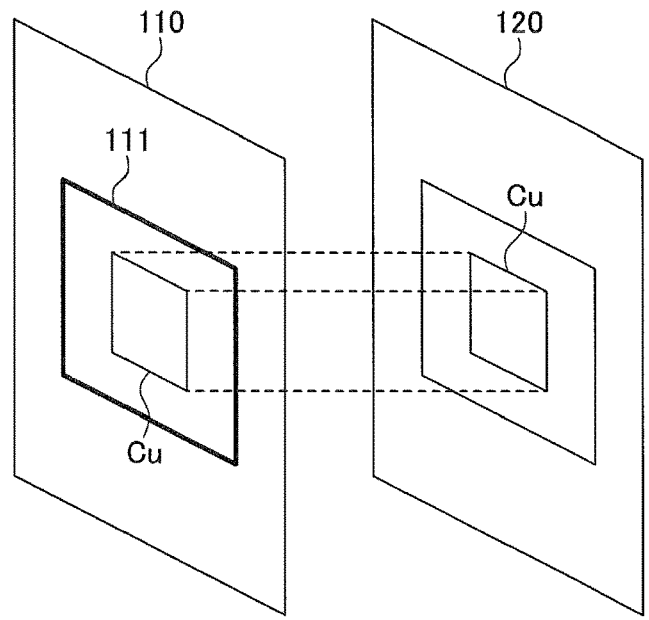
FIGS. 7A and 7B are diagrams illustrating a motion vector search in a currently processed image.
Figure 7B:
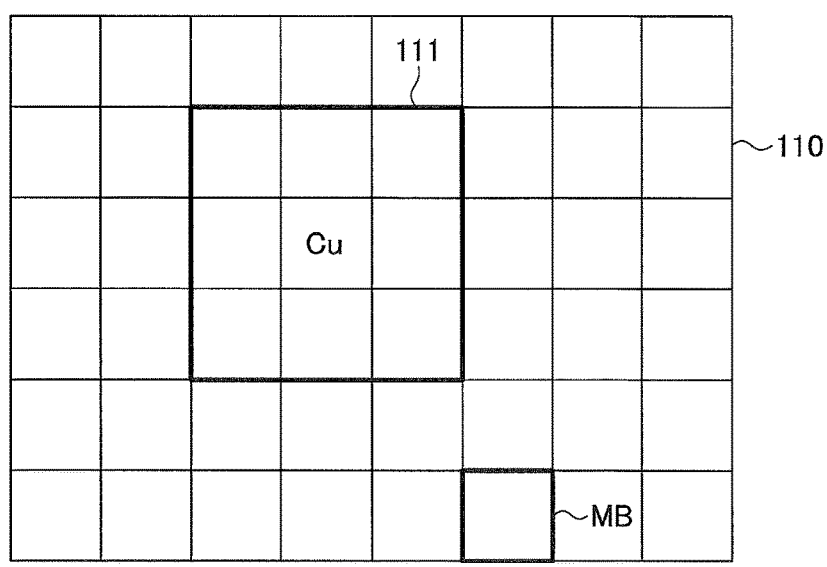

FIGS. 7A and 7B are diagrams illustrating a motion vector search in a currently processed image. As illustrated in FIG. 7A, the motion vector of the current macroblock Cu included in a currently processed image 120 is detected. The detection employs a reference image 110 that is an image temporally different from the currently processed image 120 and has been encoded before the currently processed image 120. In the reference image 110, a search range 111 that includes a virtual macroblock spatially at the same position as the current macroblock Cu is set. The virtual macroblock corresponding to the current macroblock Cu may be referred to by the same reference symbol "Cu" for its explicit indication. The motion search searches for a candidate block whose evaluation value is the smallest relative to the current macroblock Cu within the search range 111.

As illustrated in FIG. 7B, the size of the search range 111 is determined so as to include the virtual macroblock Cu and the eight surrounding macroblocks of the virtual macroblock Cu. The current macroblock Cu is, for example, a pixel matrix of 16×16 pixels. Based on this macroblock size, the size of the search range 111 is determined so as to include ±16 pixels in each of a horizontal direction and a vertical direction relative to the current macroblock Cu. In the case of this setting, the size of the search range 111 is 48×48 pixels (which is a size including 3×3 macroblocks).

Here, a description is given of a full search of a search range.

Figure 11A:
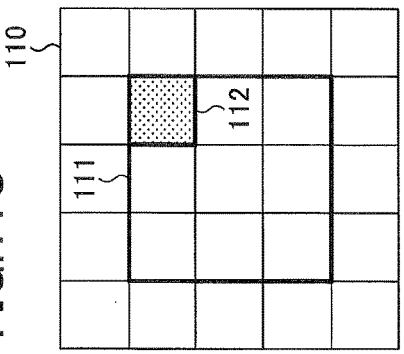
FIGS. 11A through 11F are diagrams illustrating a full search in a motion search.

FIGS. 11A through 11F are diagrams illustrating a full search in a motion search. First, as illustrated in FIG. 11A, a candidate block 112 is set at the top left of the search range 111. Then, an evaluation value is calculated based on the pixel values of the pixels included in the candidate block 112 and the pixel values of the pixels included in the current macroblock Cu. As described above, the evaluation value is, for example, an SAD. The evaluation value thus calculated is stored in correlation with the position information of the candidate block 112. For example, in the case of performing this search in the motion search part 44 illustrated in FIG. 2, the calculated evaluation value is stored in, for example, a buffer included in the motion search part 44. The evaluation values calculated in the following description also are stored in the same manner.

Figure 11B:
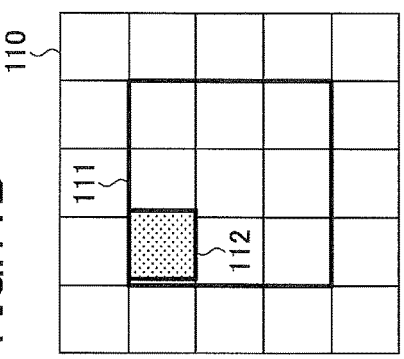
Figure 11C:
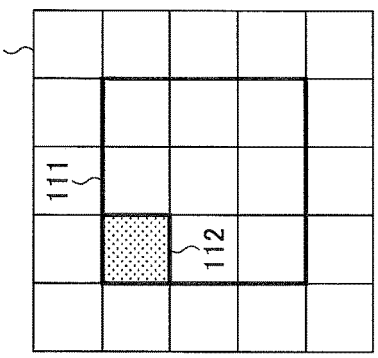

Next, as illustrated in FIG. 11B, the candidate block 112 is shifted rightward by one pixel in the search range 111. Then, the evaluation value of this candidate block 112 is calculated. In this manner, the evaluation value of the candidate block 112 is successively calculated by shifting the candidate block 112 rightward one pixel by one pixel. Then, when the evaluation value of the candidate block 112 set at the right end in the search range 111 is calculated as illustrated in FIG. 11C, the same process as described above is performed on the candidate block 112 shifted downward by one pixel from the top left block.

Figure 11D:
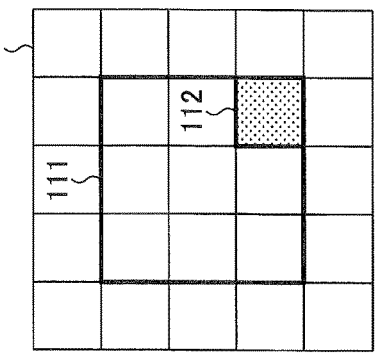
Figure 11E:
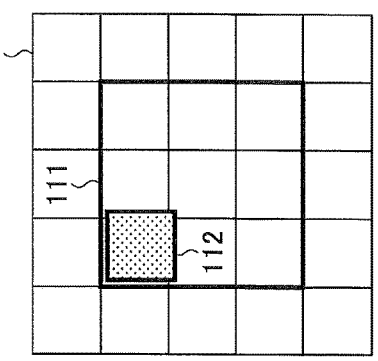
Figure 11F:
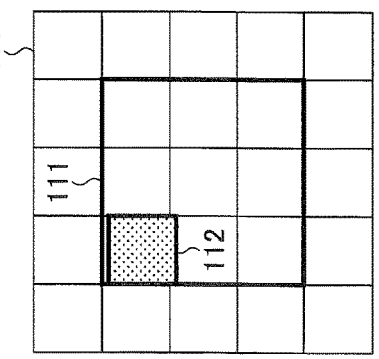

That is, as illustrated in FIG. 11D, the candidate block 112 is set at the position shifted downward by one pixel from the top end at the left end in the search range 111. Then, the evaluation value of this candidate block 112 is calculated. Then, as illustrated in FIG. 11E, the candidate block 112 is shifted rightward by one pixel in the search range 111. Then, the evaluation value of this candidate block 112 is calculated. In this manner, the setting position of the candidate block 112 is shifted one pixel by one pixel, and the evaluation value of the candidate block 112 set at each position is calculated. Then, as illustrated in FIG. 11F, the candidate block 112 is set at the bottom right of the search range 111, and the evaluation value of this candidate block 112 is calculated.

In this manner, the evaluation values of all the candidate blocks 112 set in the search range 111 are calculated and stored, and the position information of the candidate block 112 correlated with the smallest one of all the stored evaluation values is obtained.

Figure 12:
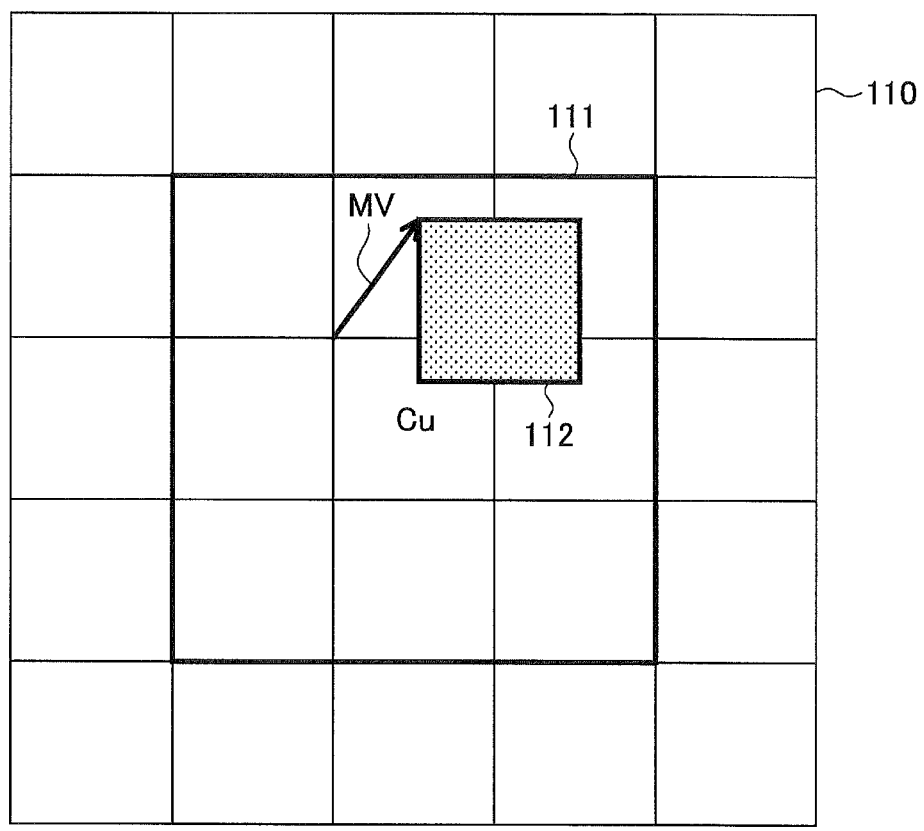
FIG. 12 is a diagram illustrating a reference image, a search range, and a search result.

For example, as illustrated in FIG. 12, the candidate block 112 whose evaluation value is the smallest is detected by the above-described motion search. Then, the displacement from the virtual macroblock Cu to the detected candidate block 112 is calculated in the reference image 110. This displacement is the motion vector MV of the current macroblock Cu.

Next, a description is given of a motion search with reduced images.

Figure 8A:
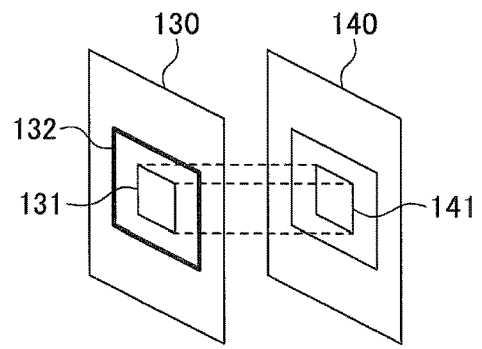
FIGS. 8A and 8B are diagrams illustrating a motion vector search in a reduced image.
Figure 8B:
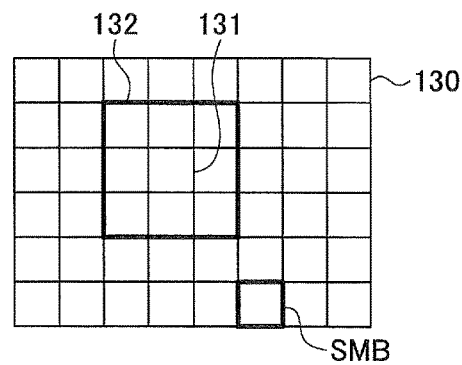

FIGS. 8A and 8B are diagrams illustrating a motion vector search in a reduced image. The reduced image of each of the currently processed image 120 and the reference image 110 illustrated in FIG. 7A is generated.

Referring to FIG. 8A, a reduced-size image 140 is obtained by reducing the currently processed image 120 illustrated in FIG. 7A by, for example, ½ in size. Likewise, a reduced reference image 130 is obtained by reducing the reference image 110 illustrated in FIG. 7A by, for example, ½ in size. A reduced-size macroblock 141 included in the reduced-size image 140 is obtained by reducing the current macroblock Cu illustrated in FIG. 7A by ½ in size. With respect to this reduced-size macroblock 141, a search range 132 whose center is at a virtual macroblock 131 spatially at the same position as the reduced-size macroblock 141 is set in the reduced reference image 130.

As illustrated in FIG. 8B, the size of the search range 132 is determined in accordance with the virtual macroblock 131 and the size of the virtual macroblock 131. A single reduced-size macroblock SMB is, for example, a pixel matrix of 8×8 pixels. Based on this size of the reduced-size macroblock SMB, the search range 132 is determined so as to include, for example, ±8 pixels in each of a horizontal direction and a vertical direction relative to the reduced-size macroblock SMB. In the case of this setting, the size of the search range 132 is 24×24 pixels. In this search range 132, a search is performed using the current reduced-size macroblock SMB.

Figure 9A:
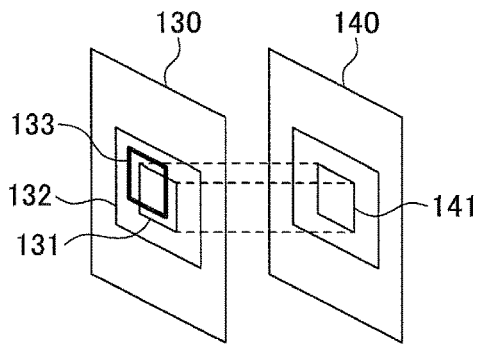
FIGS. 9A and 9B are diagrams illustrating the motion vector search in the reduced image.
Figure 9B:
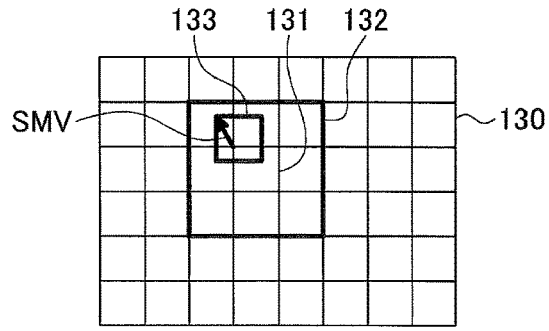

As illustrated in FIG. 9A, a candidate block 133 whose evaluation value is the smallest relative to the reduced-size macroblock SMB is detected in the search range 132. Then, as illustrated in FIG. 9B, the displacement (motion vector SMV) of the candidate block 133 relative to the virtual macroblock 131 is calculated. Based on the motion vector detected in this manner, the motion vector MV is detected with respect to the original size image.

Figure 10A:
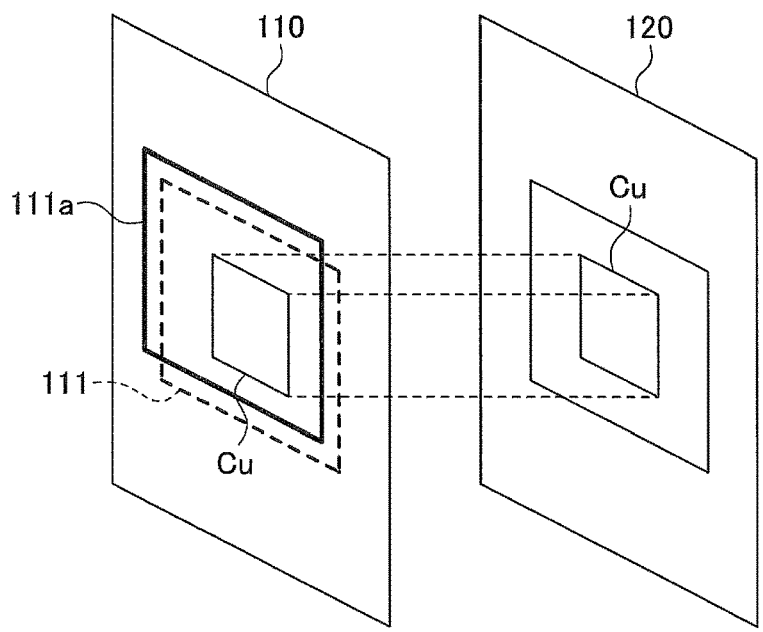
FIGS. 10A and 10B are diagrams illustrating a motion vector search in the currently processed image.

That is, as illustrated in FIG. 10A, in the reference image 110, a search range is determined based on the motion vector SMV detected as described above. The motion vector SMV is a motion vector searched out with the reduced images 140 and 130 (see FIG. 8A) to which the currently processed image 120 and the reference image 110 are reduced by ½, respectively. Therefore, a virtual motion vector PMV is calculated by doubling each of the horizontal component and the vertical component of the motion vector SMV. The virtual motion vector PMV indicates a location where a candidate block whose evaluation value is the smallest with respect to the current macroblock Cu can be present with high probability.

Figure 10B:
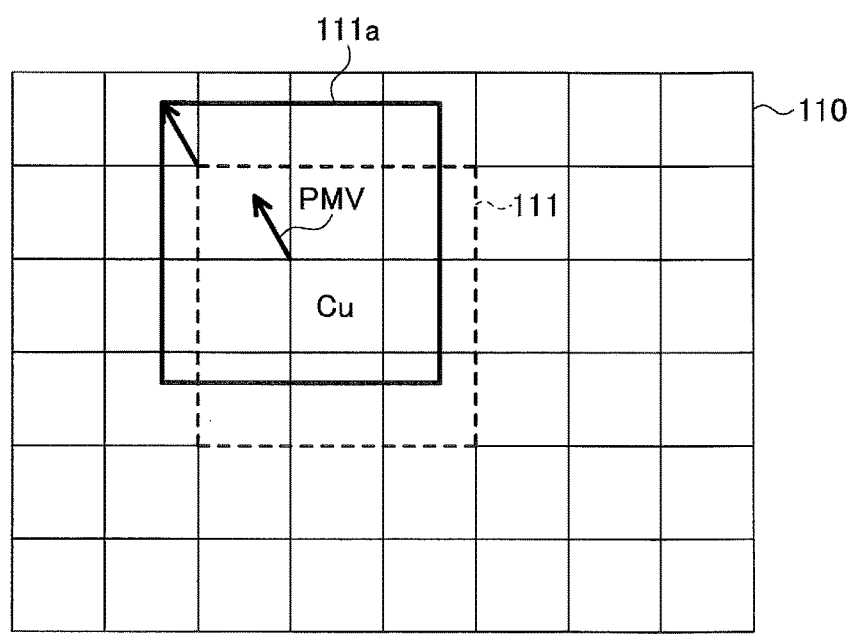

Therefore, as illustrated in FIG. 10B, a search range is set in the reference image 110 in accordance with the virtual motion vector PMV. For example, a search range 111a to which the search range 111 whose center is at the virtual macroblock Cu is offset in accordance with the virtual motion vector PMV is set. It is highly probable that the candidate block 112 that has the smallest evaluation value in correspondence to the current macroblock Cu is present at the center of the search range 111a thus determined. That is, pixels whose difference from the pixels of the current macroblock Cu is the smallest are included in the center of the search range 111a thus determined. On the other hand, pixels whose difference from the pixels of the current macroblock Cu are included in a region between the search range 111a and the search range 111 outside the search range 111a. Accordingly, by thus setting the offset search range 111a, it is possible to perform an efficient search.

Figure 13:
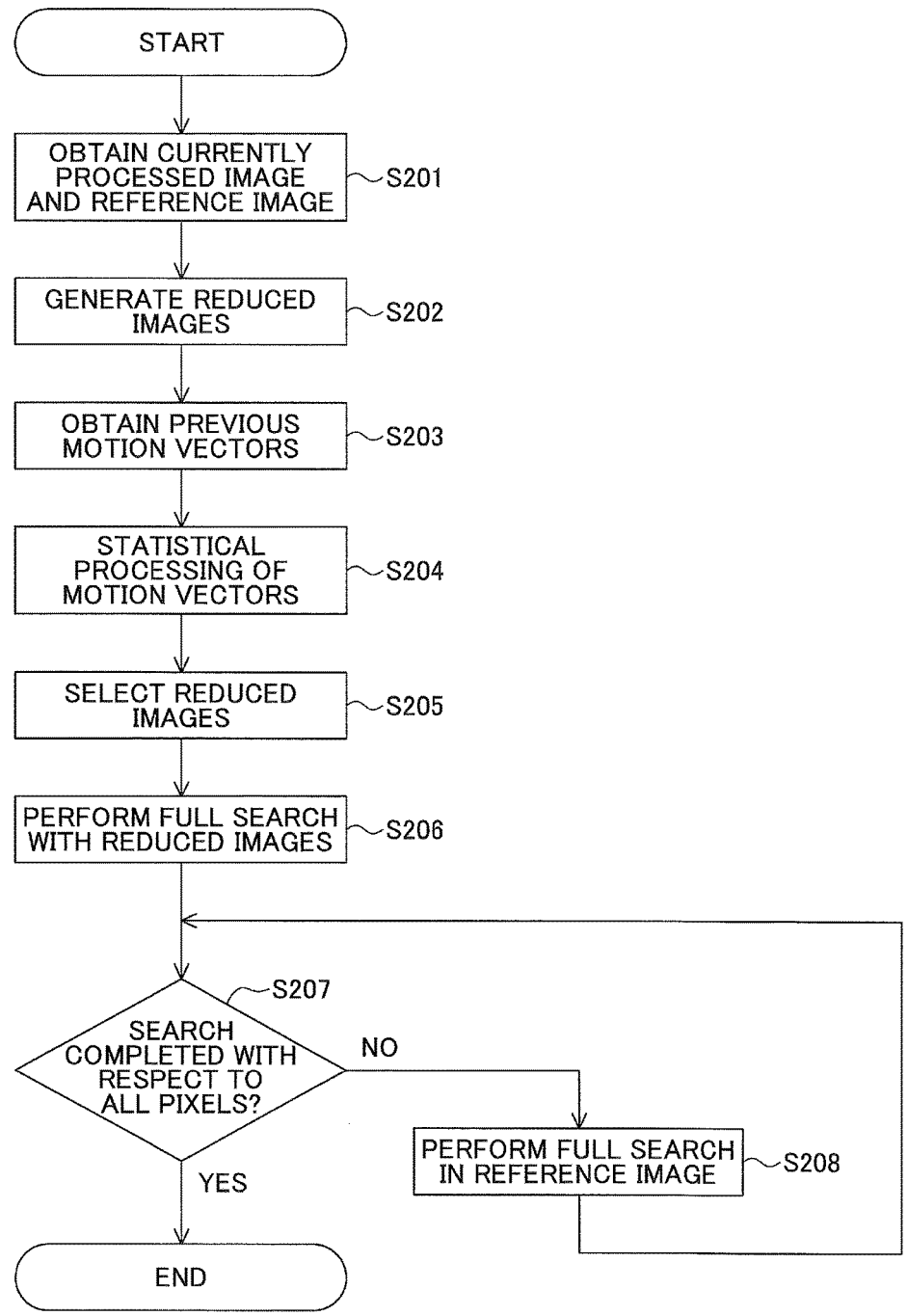
FIG. 13 is a flowchart illustrating a process according to an embodiment.

FIG. 13 is a flowchart functionally illustrating a process performed on a single macroblock in the motion vector detection part 32. It is also possible to perform a process for detecting a motion vector in accordance with this flowchart.

First, at step S201, a currently processed image and a reference image are obtained. Then, at step S202, reduced images of multiple patterns are generated for each of the currently processed image and the reference image.

Next, at step S203, previous motion vectors MVs are obtained. Then, at step S204, statistical processing is performed on the motion vectors MVs. At step S205, reduced images are selected from among the multiple reduced images based on the result of the statistical processing.

Next, at step S206, a search is performed in accordance with the full search process using the reduced images (a reduced-size image and a reduced reference image) so as to detect the motion vector SMV of the current macroblock Cu. At step S207, it is determined whether the search is completed with respect to all pixels. If the search is completed with respect to all the pixels included in a search range (YES at step S207), the process ends. If the search is not completed with respect to all the pixels (NO at step S207), the process proceeds to step S208. At step S208, a search range is set in the reference image based on the detected motion vector SMV. Then, a search is performed in the search range in the reference image in accordance with the full search process.

Next, a description is given of a process according to a comparative example.

Figure 14:
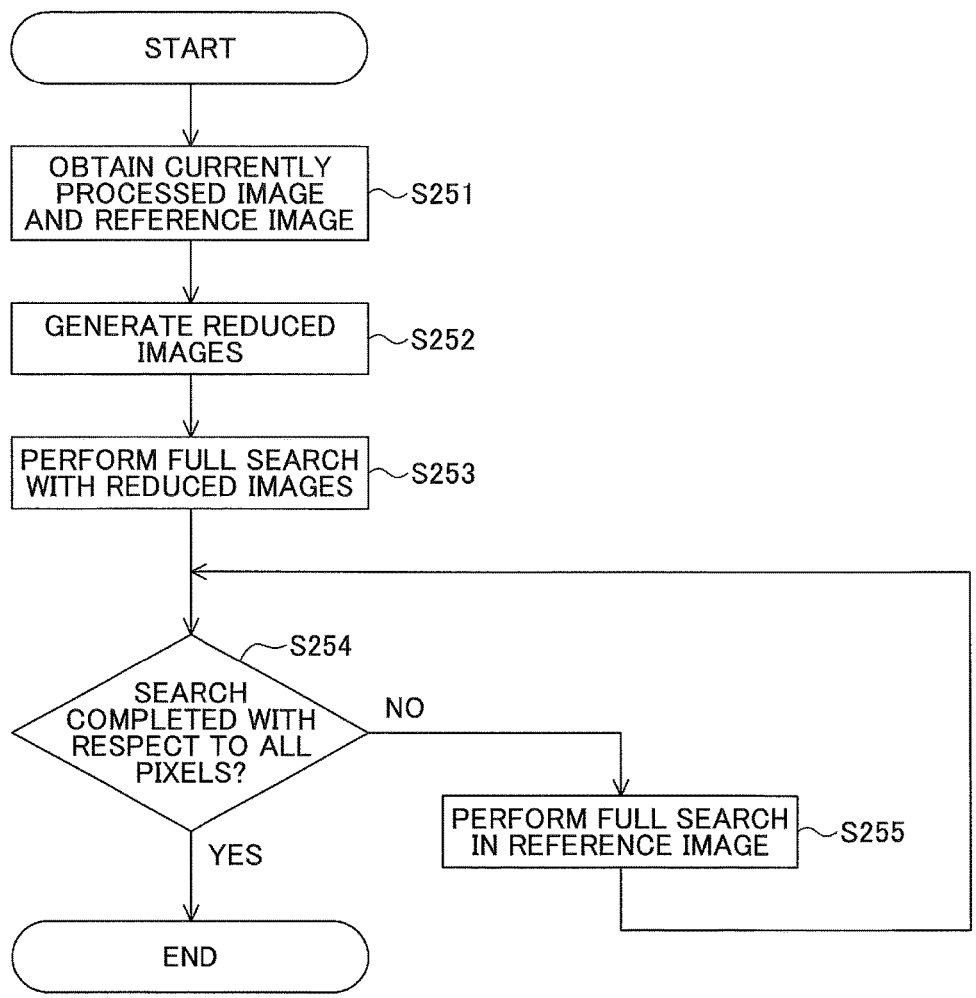
FIG. 14 is a flowchart illustrating a process according to a comparative example.

FIG. 14 is a flowchart illustrating a process according to a comparative example. As illustrated in FIG. 14, at step S251, a currently processed image and a reference image are obtained. At step S252, a single reduced image is generated for each of the currently processed image and the reference image (a reduced-size image and a reduced reference image). At step S253, a search is performed in accordance with the full search process using the reduced images (reduced-size image and reduced reference image) so as to detect the motion vector SMV of the current macroblock Cu. At step S254, it is determined whether the search is completed with respect to all pixels. If the search is completed with respect to all the pixels included in a search range (YES at step S254), the process ends. If the search is not completed with respect to all the pixels (NO at step S254), the process proceeds to step S255. At step S255, a search range is set in the reference image based on the detected motion vector SMV, and a search is performed in the search range in accordance with the full search process.

Next, a description is given of motion vectors used for statistical processing.

Figure 15:
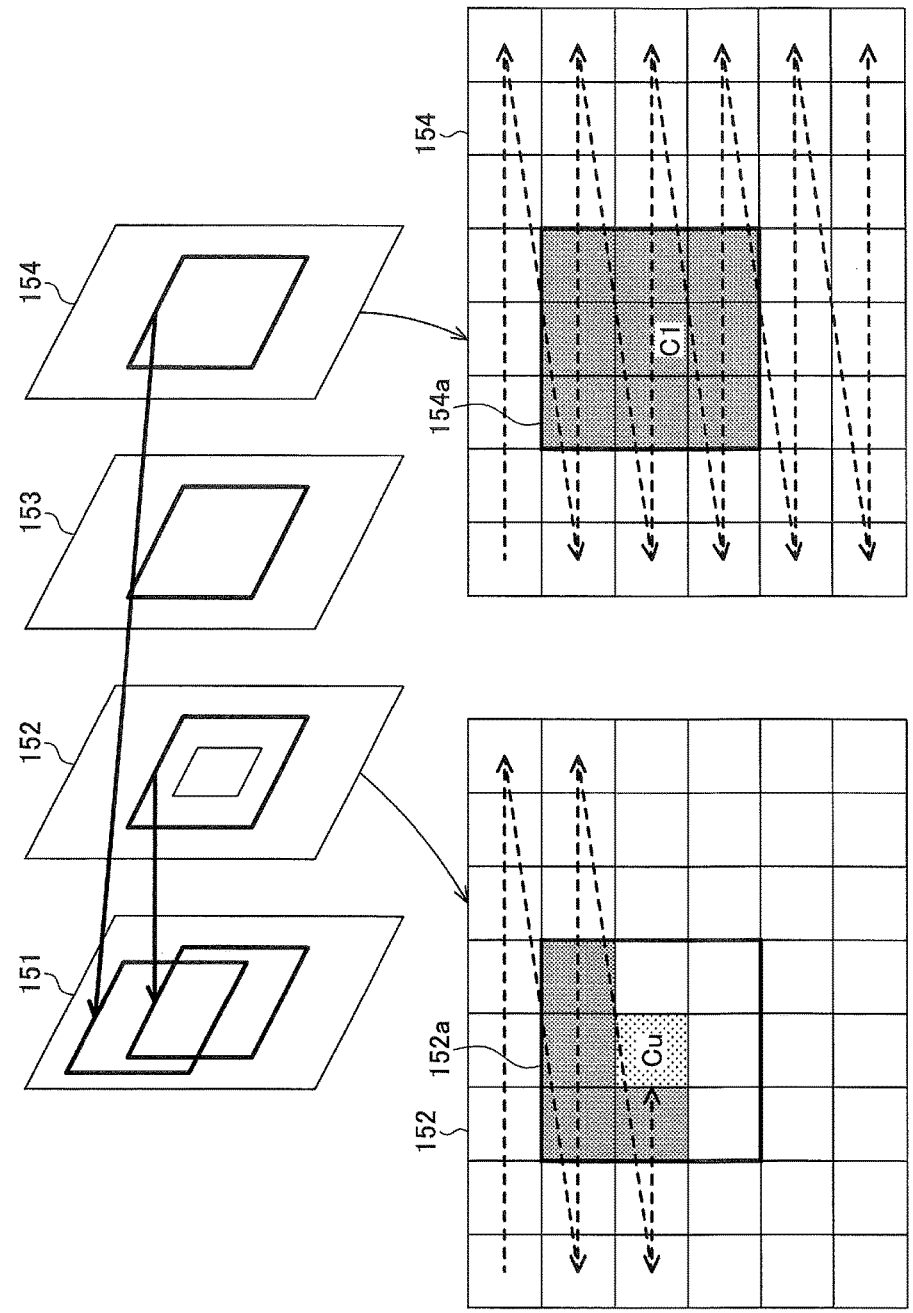
FIG. 15 is a diagram illustrating macroblocks used in statistical processing.

FIG. 15 is a diagram illustrating macroblocks used for statistical processing. As illustrated in FIG. 15, four images (pictures) 151, 152, 153 and 154 are captured in this order. For example, the picture 151 is an I-picture or a P-picture, the picture 154 is a P-picture, and the pictures 152 and 153 are B-pictures.

For example, it is assumed that the picture 152 is a currently processed image, and the motion vector of a current macroblock Cu included in this currently processed image 152 is detected. At this point, in the currently processed image 152, macroblocks have been encoded in order from the top left macroblock along a raster direction (indicated by broken arrows), and motion vectors have been generated with respect to these macroblocks. The motion vectors obtained by referring to the previous reference image 151 from the currently processed image 152 are used in, of these encoded macroblocks, those included in a reference region 152a whose center is at the current macroblock Cu (the macroblocks indicated by darker hatching than the current macroblock Cu). The reference region 152a is set to the same size as the search range 111 illustrated in FIG. 7B, for example. The statistical motion vector MVS is generated by performing statistical processing on (averaging) the motion vectors of these macroblock. One of the reduced images of multiple patterns is selected based on the statistical motion vector MVS.

Alternatively, when forward reference is available with respect to the currently processed image 152, the picture 154 that is referred to (a forward reference image) is a P-picture, and this forward reference image 154 refers to the previous picture (backward reference image) 151. All the macroblocks included in this forward reference image 154 have been encoded before the currently processed image 152, and their respective motion vectors have been generated. In this forward reference image 154, the motion vectors obtained by referring to the backward reference image 151 from the forward reference image 154 are used in the macroblocks included in a reference region 154a whose center is at a virtual macroblock C1 spatially at the same position as the current macroblock Cu of the currently processed image 152. Then, the statistical motion vector MVS is generated by performing statistical processing on (averaging) the motion vectors of the currently processed image 152 and the motion vectors of the forward reference image 154. One of the reduced images of multiple patterns is selected based on the statistical motion vector MVS.

Next, a description is given of patterns of reduced images.

As described above, the motion vector detection part 32 illustrated in FIG. 2 selects, with respect to the current macroblock Cu, a reduced image based on the statistical motion vector MVS obtained by performing statistical processing on the motion vectors of the surrounding macroblocks (the macroblocks included in the currently processed image 152 or the currently processed image 152 and the forward reference image 154) of the current macroblock Cu. Therefore, the patterns of reduced images are determined in accordance with the possible directions of the statistical motion vector MVS. Each pattern is determined so as to use a reduced image in which pixels are reduced in a pattern corresponding to a direction of strong motion.

FIGS. 16A through 16D are diagrams illustrating a process of creating a reduced image.

Figure 16A:
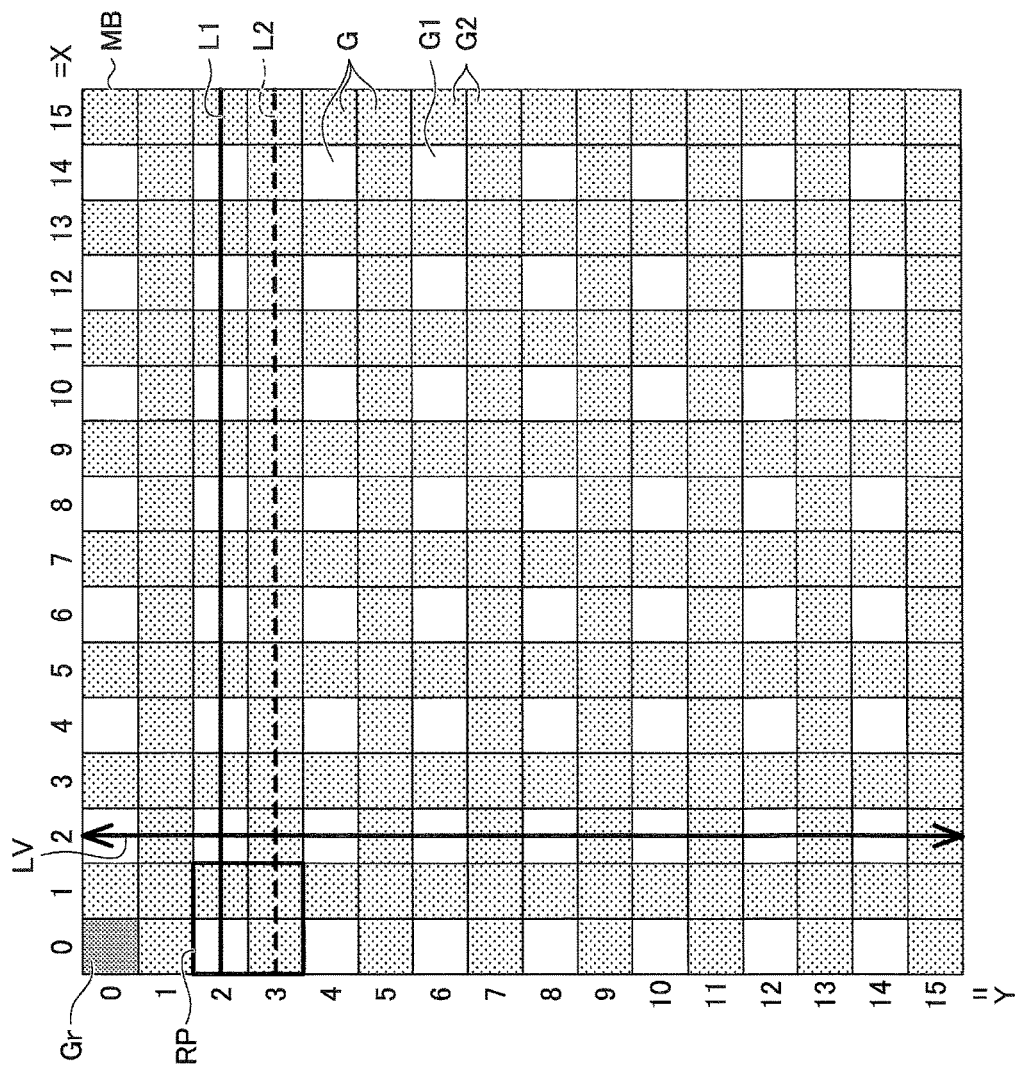

Referring to FIG. 16A, a macroblock MB is, for example, a pixel matrix of 16×16 pixels G. In this macroblock MB, the top left pixel is determined as a reference pixel Gr. In FIG. 16A, the numbers to the left of the macroblock MB indicate pixel positions from the reference pixel Gr in a vertical direction, and the numbers on top of the macroblock MB indicate pixel positions from the reference macroblock MB in a horizontal direction.

In FIG. 16A, arrows LV indicate the directions of the statistical motion vector MVS. A pattern is designed so that pixels are reduced in a direction perpendicular to the statistical motion vector MVS, and a reduced image is generated based on this pattern. To be specific, first lines L1 and second lines L2 that are perpendicular to the statistical motion vector MVS are alternately set in a direction along the statistical motion vector MVS (LV). In FIG. 16A, one of the first lines L1 and one of the second lines L2 are illustrated. Pixels are to be retained on the first lines L1, while the pixels on the second lines L2 are to be eliminated. Furthermore, every other pixel is eliminated on the first lines L1. In FIG. 16A, pixels G2 indicated by a dot pattern (except the reference pixel Gr) are to be eliminated in the reduction part 41 (see FIG. 2), while the reference pixel Gr and pixels G1 with no dot pattern are to be included in the reduced image.

By reducing pixels in accordance with the first lines L1 and the second lines L2 as described above, the reduced-size macroblock SMB illustrated in FIG. 16D is generated. This reduced-size macroblock SMB is a pixel matrix of 8×8 pixels. The numbers in each pixel of the reduced-size macroblock SMB indicates a pixel position (a vertical position and a horizontal position) in the macroblock MB illustrated in FIG. 16A.

The rectangle indicated by a bold line in FIG. 16A indicates a repeated pattern RP in the macroblock MB. This repeated pattern RP is a region including a pixel G1 to remain and pixels G2 to be eliminated. This repeated pattern RP is repeated along a direction of pixel arrangement so as to form the reduced-size macroblock SMB.

The size-reduced macroblock SMB generated in the above-described manner is selected in accordance with the statistical motion vector MVS. A vector represents a direction and a magnitude. As described above, the reduced-size macroblock SMB is generated so as to be a pattern where pixels are reduced in accordance with a direction of strong motion. Accordingly, the reduced-size macroblock SMB may be selected in accordance with the direction of the statistical motion vector MVS. Therefore, selection according to the direction of a vector is enabled by generating a pattern in accordance with the ratio of the vertical component and the horizontal component of the statistical motion vector MVS.

As illustrated in FIG. 16B, a downward direction and an upward direction relative to a vertical component MVy of the statistical motion vector MVS are determined to be a positive ("+") direction and a negative ("−") direction, respectively. Furthermore, a rightward direction and a leftward direction relative to a horizontal component MVx of the statistical motion vector MVS are determined to be a positive ("+") direction and a negative ("−") direction, respectively.

FIG. 16C illustrates the ratio of the vertical component MVy and the horizontal component MVx of the statistical motion vector MVS. For example, in the case of the statistical motion vector MVS that is parallel to a direction of pixel arrangement (vertical direction) of the macroblock MB, the ratio of the vertical component MVy and the horizontal component MVx is "vertical:horizontal=1:0" or "vertical:horizontal=−1:0." In FIG. 16C, a black circle indicates a zero ("0") component.

FIGS. 17 through 20 illustrate pixel reduction patterns of the macroblock MB that correspond to vertical component-horizontal component ratios of the statistical motion vector MVS as CASE n. In FIGS. 17 through 20, reference symbols such as those of pixels are omitted.

In CASE 1 illustrated in FIG. 17, a reduced image of a pattern in the case where the ratio of the vertical component and the horizontal component of the statistical motion vector MVS is "vertical:horizontal=1:0" or "vertical:horizontal=−1:0" is generated. This case is the pattern illustrated in FIGS. 16A through 16D. FIG. 17 illustrates typical examples of vertical component-horizontal component ratios. In CASE 2, a reduced image of a pattern in the case where the ratio of the vertical component and the horizontal component of the statistical motion vector MVS is "vertical:horizontal=8:−1" or "vertical:horizontal=−8:1" is generated. Furthermore, in CASE 3, a reduced image of a pattern in the case where the ratio of the vertical component and the horizontal component of the statistical motion vector MVS is "vertical:horizontal=4:−1" or "vertical:horizontal=−4:1" is generated. Furthermore, in CASE 4, a reduced image of a pattern in the case where the ratio of the vertical component and the horizontal component of the statistical motion vector MVS is "vertical:horizontal=2:−1" or "vertical:horizontal=−2:1" is generated.

Figure 18:
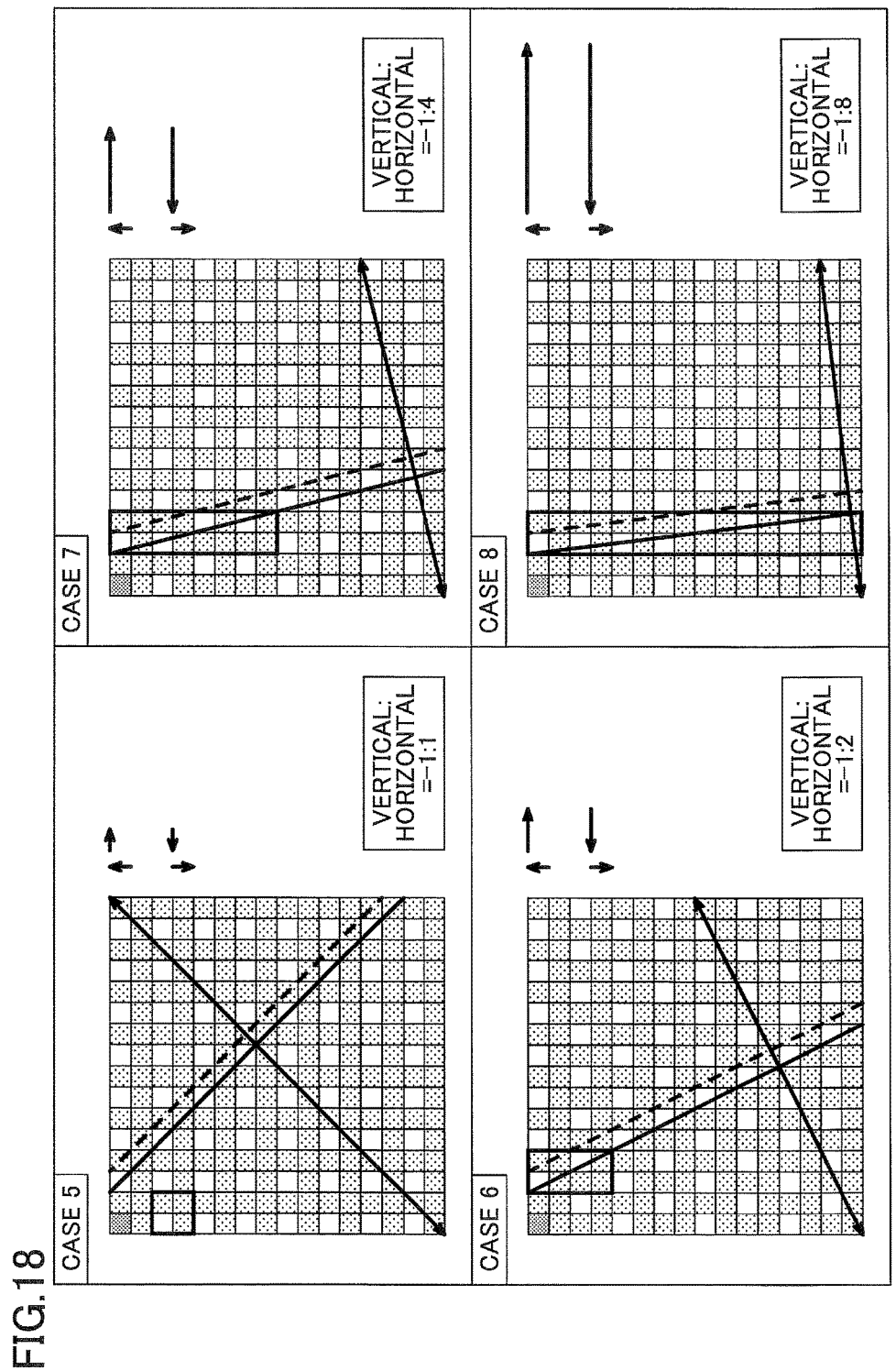
FIG. 18 is a diagram illustrating reduced image patterns.

Referring to FIG. 18, in CASE 5, a reduced image of a pattern in the case where the ratio of the vertical component and the horizontal component of the statistical motion vector MVS is "vertical:horizontal=−1:1" or "vertical:horizontal=1:−1" is generated. Furthermore, in CASE 6, a reduced image of a pattern in the case where the ratio of the vertical component and the horizontal component of the statistical motion vector MVS is "vertical:horizontal=−1:2" or "vertical:horizontal=1:−2" is generated. Furthermore, in CASE 7, a reduced image of a pattern in the case where the ratio of the vertical component and the horizontal component of the statistical motion vector MVS is "vertical:horizontal=−1:4" or "vertical:horizontal=1:−4" is generated. Furthermore, in CASE 8, a reduced image of a pattern in the case where the ratio of the vertical component and the horizontal component of the statistical motion vector MVS is "vertical:horizontal=−1:8" or "vertical:horizontal=1:−8" is generated.

Figure 19:
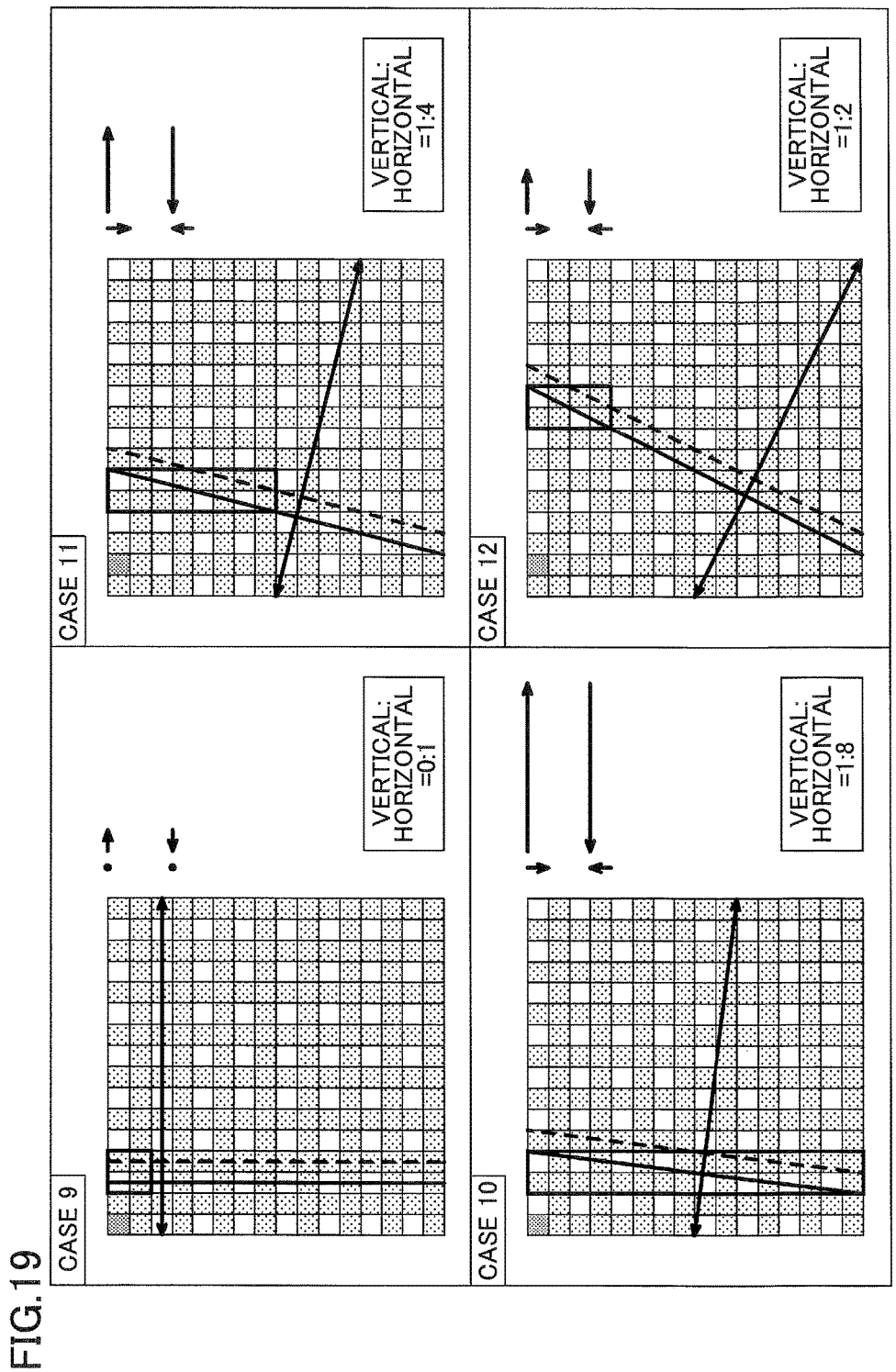
FIG. 19 is a diagram illustrating reduced image patterns.

Referring to FIG. 19, in CASE 9, a reduced image of a pattern in the case where the ratio of the vertical component and the horizontal component of the statistical motion vector MVS is "vertical:horizontal=0:1" or "vertical:horizontal=0:−1" is generated. Furthermore, in CASE 10, a reduced image of a pattern in the case where the ratio of the vertical component and the horizontal component of the statistical motion vector MVS is "vertical:horizontal=1:8" or "vertical:horizontal=−1:−8" is generated. Furthermore, in CASE 11, a reduced image of a pattern in the case where the ratio of the vertical component and the horizontal component of the statistical motion vector MVS is "vertical:horizontal=1:4" or "vertical:horizontal=−1:−4" is generated. Furthermore, in CASE 12, a reduced image of a pattern in the case where the ratio of the vertical component and the horizontal component of the statistical motion vector MVS is "vertical:horizontal=1:2" or "vertical:horizontal=−1:−2" is generated.

Figure 20:
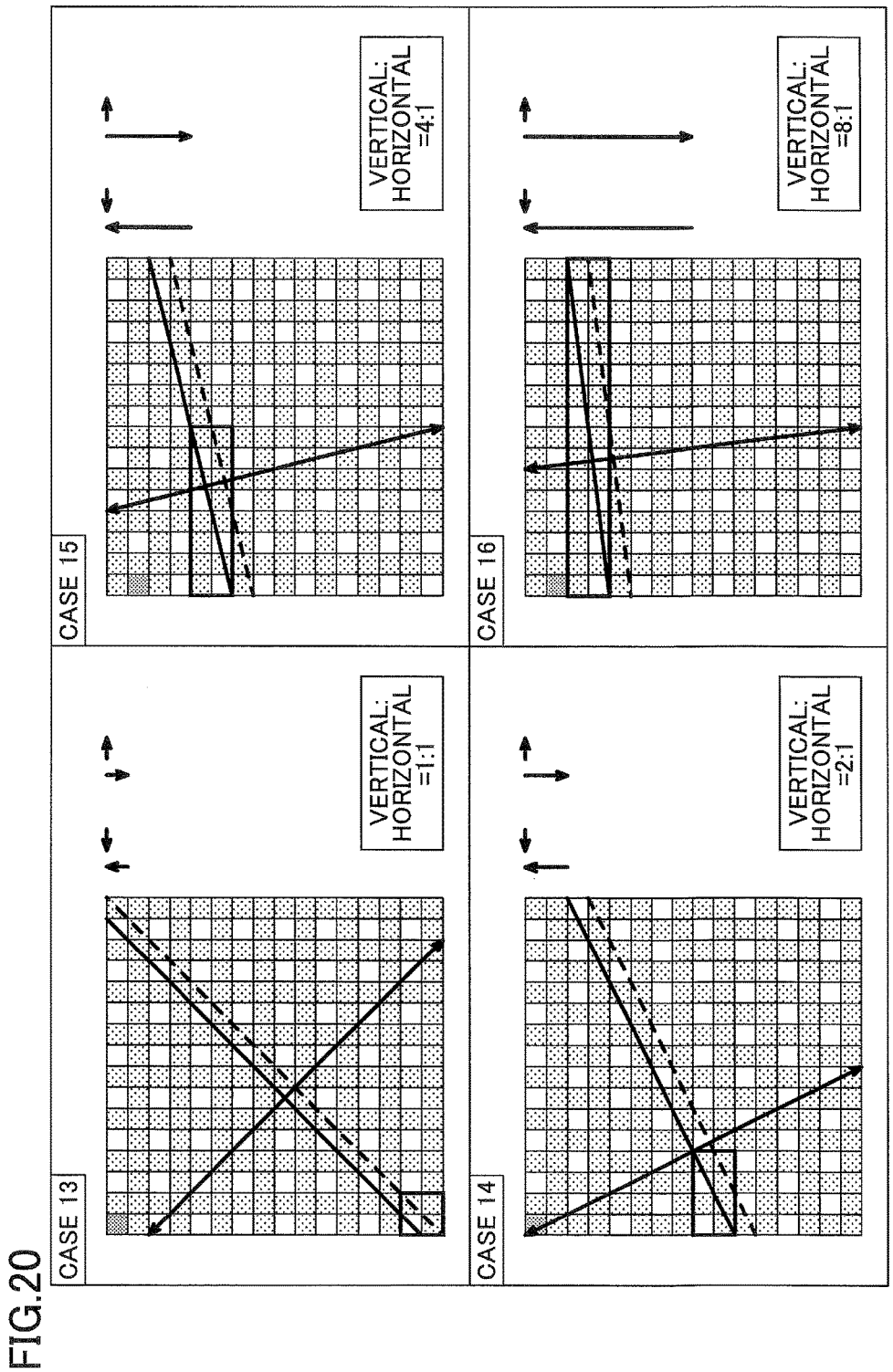
FIG. 20 is a diagram illustrating reduced image patterns.

Referring to FIG. 20, in CASE 13, a reduced image of a pattern in the case where the ratio of the vertical component and the horizontal component of the statistical motion vector MVS is "vertical:horizontal=1:1" or "vertical:horizontal=−1:−1" is generated. Furthermore, in CASE 14, a reduced image of a pattern in the case where the ratio of the vertical component and the horizontal component of the statistical motion vector MVS is "vertical:horizontal=2:1" or "vertical:horizontal=−2:−1" is generated. Furthermore, in CASE 15, a reduced image of a pattern in the case where the ratio of the vertical component and the horizontal component of the statistical motion vector MVS is "vertical:horizontal=4:1" or "vertical:horizontal=−4:−1" is generated. Furthermore, in CASE 16, a reduced image of a pattern in the case where the ratio of the vertical component and the horizontal component of the statistical motion vector MVS is "vertical:horizontal=8:1" or "vertical:horizontal=−8:−1" is generated.

The reduction pattern in CASE 5 illustrated in FIG. 18 is the same as the reduction pattern in CASE 1 illustrated in FIG. 17. That is, a reduced image according to CASE 5 includes the same pixels as a reduced image according to CASE 1. Likewise, the reduction patterns in CASE 9 illustrated in FIG. 19 and CASE 13 illustrated in FIG. 20 are the same as the reduction pattern in CASE 1, so that reduced images according to CASE 9 and CASE 13 include the same pixels as a reduced image according to CASE 1.

Next, a description is given of a process of selecting a reduced image.

Figure 21A:
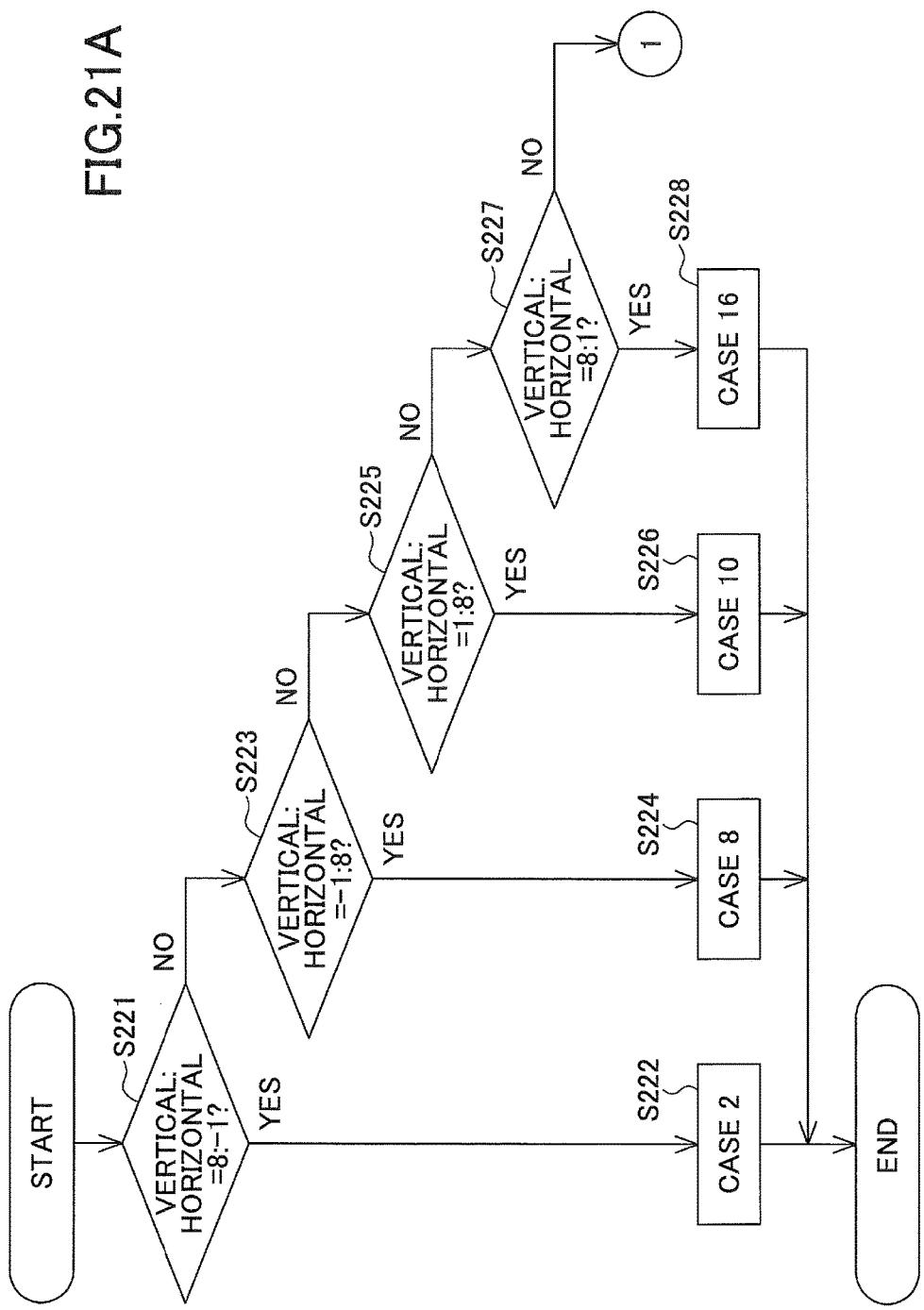

FIGS. 21A through 21C illustrate selection of a reduced image pattern based on the result of statistical processing. In FIGS. 21A through 21C, typical examples of vertical component-horizontal component ratios are applied to the decision blocks of the flowchart in correspondence to FIGS. 17 through 20.

A reduced image (pattern) is selected in accordance with the ratio of the vertical component and the horizontal component of the statistical motion vector MVS.

First, at step S221 of FIG. 21A, it is determined whether the ratio of the vertical component and the horizontal component of the statistical motion vector MVS is "vertical:horizontal=8:−1." Furthermore, it is determined whether the ratio of the vertical component and the horizontal component of the statistical motion vector MVS is "vertical:horizontal=−8:1." If it is determined that the ratio is either "vertical:horizontal=8:−1" or "vertical:horizontal=−8:1" (YES at step S221), at step S222, a reduced image of the pattern created in CASE 2 is selected. If it is determined that the ratio is neither "vertical:horizontal=8:−1" nor "vertical:horizontal=−8:1" (NO at step S221), the process proceeds to step S223.

Next, at step S223, it is determined whether or not the ratio of the vertical component and the horizontal component of the statistical motion vector MVS is "vertical:horizontal=−1:8" or "vertical:horizontal=1:−8." If it is determined that the ratio is either "vertical:horizontal=−1:8" or "vertical:horizontal=1:−8" (YES at step S223), at step S224, a reduced image of the pattern created in CASE 8 is selected. If it is determined that the ratio is neither "vertical:horizontal=−1:8" nor "vertical:horizontal=1:−8" (NO at step S223), the operation proceeds to step S225.

At step S225, it is determined whether or not the ratio of the vertical component and the horizontal component of the statistical motion vector MVS is "vertical:horizontal=1:8" or "vertical:horizontal=−1:−8." If it is determined that the ratio is either "vertical:horizontal=1:8" or "vertical:horizontal=−1:−8" (YES at step S225), at step S226, a reduced image of the pattern created in CASE 10 is selected. If it is determined that the ratio is neither "vertical:horizontal=1:8" nor "vertical:horizontal=−1:−8" (NO at step S225), the operation proceeds to step S227.

At step S227, it is determined whether or not the ratio of the vertical component and the horizontal component of the statistical motion vector MVS is "vertical:horizontal=8:1" or "vertical:horizontal=−8:−1." If it is determined that the ratio is either "vertical:horizontal=8:1" or "vertical:horizontal=−8:−1" (YES at step S227), at step S228, a reduced image of the pattern created in CASE 16 is selected. If it is determined that the ratio is neither "vertical:horizontal=8:1" nor "vertical:horizontal=−8:−1" (NO at step S227), the operation proceeds to step S229 of FIG. 21B.

Next, at step S229 of FIG. 21B, it is determined whether or not the ratio of the vertical component and the horizontal component of the statistical motion vector MVS is "vertical:horizontal=4:−1" or "vertical:horizontal=−4:1." If it is determined that the ratio is either "vertical:horizontal=4:−1" or "vertical:horizontal=−4:1" (YES at step S229), at step S230, a reduced image of the pattern created in CASE 3 is selected. If it is determined that the ratio is neither "vertical:horizontal=4:−1" nor "vertical:horizontal=−4:1" (NO at step S229), the process proceeds to step S231.

At step S231, it is determined whether or not the ratio of the vertical component and the horizontal component of the statistical motion vector MVS is "vertical:horizontal=−1:4" or "vertical:horizontal=1:−4." If it is determined that the ratio is either "vertical:horizontal=−1:4" or "vertical:horizontal=1:−4" (YES at step S231), at step S232, a reduced image of the pattern created in CASE 7 is selected. If it is determined that the ratio is neither "vertical:horizontal=−1:4" nor "vertical:horizontal=1:−4" (NO at step S231), the process proceeds to step S233.

At step S233, it is determined whether or not the ratio of the vertical component and the horizontal component of the statistical motion vector MVS is "vertical:horizontal=1:4" or "vertical:horizontal=−1:−4." If it is determined that the ratio is either "vertical:horizontal=1:4" or "vertical:horizontal=−1:−4" (YES at step S233), at step S234, a reduced image of the pattern created in CASE 11 is selected. If it is determined that the ratio is neither "vertical:horizontal=1:4" nor "vertical:horizontal=−1:−4" (NO at step S233), the process proceeds to step S235.

At step S235, it is determined whether or not the ratio of the vertical component and the horizontal component of the statistical motion vector MVS is "vertical:horizontal=4:1" or "vertical:horizontal=−4:−1." If it is determined that the ratio is either "vertical:horizontal=4:1" or "vertical:horizontal=−4:−1" (YES at step S235), at step S236, a reduced image of the pattern created in CASE 15 is selected. If it is determined that the ratio is neither "vertical:horizontal=4:1" nor "vertical:horizontal=−4:−1" (NO at step S235), the process proceeds to step S237 of FIG. 21C.

Next, at step S237 of FIG. 21C, it is determined whether or not the ratio of the vertical component and the horizontal component of the statistical motion vector MVS is "vertical:horizontal=2:−1" or "vertical:horizontal=−2:1." If it is determined that the ratio is either "vertical:horizontal=2:−1" or "vertical:horizontal=−2:1" (YES at step S237), at step S238, a reduced image of the pattern created in CASE 4 is selected. If it is determined that the ratio is neither "vertical:horizontal=2:−1" nor "vertical:horizontal=−2:1" (NO at step S237), the process proceeds to step S239.

At step S239, it is determined whether or not the ratio of the vertical component and the horizontal component of the statistical motion vector MVS is "vertical:horizontal=−1:2" or "vertical:horizontal=1:−2." If it is determined that the ratio is either "vertical:horizontal=−1:2" or "vertical:horizontal=1:−2" (YES at step S239), at step S240, a reduced image of the pattern created in CASE 8 is selected. If it is determined that the ratio is neither "vertical:horizontal=−1:2" nor "vertical:horizontal=1:−2" (NO at step S239), the process proceeds to step S241.

At step S241, it is determined whether or not the ratio of the vertical component and the horizontal component of the statistical motion vector MVS is "vertical:horizontal=1:2" or "vertical:horizontal=−1:−2." If it is determined that the ratio is either "vertical:horizontal=1:2" or "vertical:horizontal=−1:−2" (YES at step S241), at step S242, a reduced image of the pattern created in CASE 12 is selected. If it is determined that the ratio is neither "vertical:horizontal=1:2" nor "vertical:horizontal=−1:−2" (NO at step S241), the process proceeds to step S243.

At step S243, it is determined whether or not the ratio of the vertical component and the horizontal component of the statistical motion vector MVS is "vertical:horizontal=2:1" or "vertical:horizontal=−2:−1." If it is determined that the ratio is either "vertical:horizontal=2:1" or "vertical:horizontal=−2:−1" (YES at step S243), at step S244, a reduced image of the pattern created in CASE 14 is selected. If it is determined that the ratio is neither "vertical:horizontal=2:1" nor "vertical:horizontal=−2:−1", that is, the ratio is none of the above-described ratios (NO at step S243), at step S245, a reduced image of the pattern created in CASE 1 is selected.

As described above, according to this embodiment, for example, the following effects are produced.

(a) The motion vector detection part 32 detects the motion vector MV of a current macroblock Cu using the macroblocks input from the MB division part 21 and a reference image stored in the previous frame buffer 31. The reduction part 41 of the motion vector detection part 32 generates reduced-size macroblocks SMBs to which the macroblocks are reduced at a predetermined reduction ratio. The statistical processing part 42 generates pattern selection information (a statistical motion vector MVS) for selecting one of the reduced images of multiple patterns generated in the reduction part 41. The motion search part 43 selects one of the reduced images based on the pattern selection information (statistical motion vector MVS) with respect to each of a currently processed image and the reference image, and searches the reduced reference image to detect the motion vector SMV of the reduced macroblock SMB. The motion search part 44 performs a motion search in a search range according to the motion vector SMV input from the motion search part 43 with respect to each of the macroblocks that are the units of processing of the motion search, so as to detect the motion vector MV of the current macroblock Cu.

In the motion search part 44, a search range is set (offset) in the reference image in accordance with the motion vector SMV detected in the motion search part 43. The motion vector SMV is detected by the motion search part 43 using reduced images of a pattern corresponding to the pattern selection information (statistical motion vector MVS) calculated from the motion vectors MVs of the surrounding macroblocks of the current macroblock Cu alone or in combination with the motion vectors MVs of a virtual macroblock and its surrounding macroblocks in a forward reference image.

The motion of the current macroblock Cu is highly correlated with the motions of its surrounding macroblocks. Accordingly, by using reduced images of a pattern corresponding to the motion vector of the current macroblock Cu, using the pattern selection information (statistical motion vector MVS) obtained by performing statistical processing on motion vectors in surrounding macroblocks, it is possible to detect the motion vector SMV with high accuracy. Furthermore, by using the motion vector SMV, it is possible to set a search range corresponding to the motion vector SMV of the current macroblock Cu in a reference image, so that it is possible to efficiently detect the motion vector MV of the current macroblock. Furthermore, it is possible to accurately detect the motion vector MV. The accuracy of the motion vector MV affects the amount of data in coding (coding compression rate). Therefore, according to this embodiment, it is possible to increase prediction accuracy (coding compression rate).

For example, when a reduced image is generated by simply reducing pixels only along a horizontal direction and a vertical direction, it is possible that the reduced image does not include characteristic pixels corresponding to the motion of the current macroblock Cu. Then, it is possible that evaluation values are not properly obtained in a motion search using the reduced image. In this case, the evaluation value of a candidate block corresponding to the current macroblock Cu may be lower than the evaluation values of other candidate macroblocks, so that a detection error may occur. In this case, the error between the current macroblock and the detected reference block increases so as to increase the amount of data in a coded signal. The search range may be widened to prevent a detection error, but an increase in the search range increases a search time. Furthermore, an increase in the search range makes the motion search with reduced images useless, thus decreasing efficiency.

(b) The reduction part 41 sets the first lines L1 and the second lines L2 that are perpendicular to the statistical motion vector MVS alternately in a direction along the statistical motion vector MVS (LV). Pixels are to be retained on the first lines L1, while the pixels on the second lines L2 are to be eliminated. Furthermore, every other pixel is eliminated on the first lines L1. By thus reducing pixels in accordance with the first lines L1 and the second lines L2, it is possible to generate a reduced-size macroblock SMB (reduced image) in which pixels are reduced in a pattern corresponding to a direction of strong motion.

The above-described embodiment may be implemented in the following manner.

For example, in the above-described embodiment, the size of a macroblock and the size of a reduced-size macroblock may be suitably changed. Furthermore, the macroblock (reduced-size macroblock) may have different numbers of macroblocks in a vertical direction and a horizontal direction.

For example, in the above-described embodiment, a motion search may be performed by generating a reduced reference image to which a reference image is reduced in size and its reduced-size macroblocks in accordance with a pattern corresponding to the result of the statistical processing part 42.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

What is claimed is:

1. An encoder circuit, comprising:
   a reduction circuit configured to generate a plurality of reduced images in accordance with a plurality of pixel reduction patterns, the plurality of reduced images being generated for each of macroblocks, the plurality of pixel reduction patterns having a same reduction ratio in each of a horizontal direction and a vertical direction of the macroblock, each of a plurality of frame images included in video being divided into the macroblocks;
   a statistical processing circuit configured to perform statistical processing on motion vectors detected with respect to each of the macroblocks;
   a first motion search circuit configured to select one of the plurality of reduced images of the plurality of pixel reduction patterns generated by the reduction circuit with respect to the frame image of a reference frame, based on a result of the statistical processing, and search a first search range in the selected one of the plurality of reduced images so as to detect a first motion vector; and
   a second motion search circuit configured to search a second search range set in the reference frame based on the first motion vector so as to detect a second motion vector, wherein
   each of the macroblocks is a pixel matrix, and
   the reduction circuit is configured to generate the plurality of reduced images for each of the macroblocks by reducing pixels included in the pixel matrix in accordance with the plurality of pixel reduction patterns having the same reduction ratio with a plurality of set directions that differ in a ratio of a component in a first direction of arrangement and a component in a second direction of arrangement perpendicular to the first direction of arrangement, and
   the first motion search circuit is configured to select the one of the plurality of reduced images of the plurality of pixel reduction patterns in accordance with a ratio of a first component and a second component of a statistical motion vector, the statistical motion vector being obtained as the result of the statistical processing, the first component being in a first direction of arrangement and the second component being in a second direction of arrangement perpendicular to the first direction of arrangement.

2. The encoder circuit as claimed in claim 1, wherein the reduction circuit is configured to generate each of the plurality of reduced images by setting first lines and second lines alternately in the set direction, the first lines and second lines being perpendicular to the set direction, respectively, and eliminating every other pixel on the first lines and eliminating each of the pixels on the second lines.

3. The encoder circuit as claimed in claim 1, wherein the statistical processing circuit is configured to perform the statistical processing on the motion vectors of neighboring macroblocks of one of the macroblocks that is a target of processing in one of the frame images that is a target of processing.

4. The encoder circuit as claimed in claim 3, wherein the statistical processing circuit is configured to perform the statistical processing on the motion vectors detected in the one of the frame images and the motion vectors detected in a reference frame subsequent to the one of the frame images.

5. The encoder circuit as claimed in claim 1, wherein the statistical processing circuit is configured to perform the statistical processing on the motion vectors of, neighboring macroblocks of one of the macroblocks that is a target of processing in one of the frame images that is a target of processing and the motion vectors of the macroblocks in a reference region in the reference frame, the reference region including a macroblock spatially at a same position as the one of the macroblocks.

6. An encoding method, comprising:
   generating a plurality of reduced images in accordance with a plurality of pixel reduction patterns, the plurality of reduced images being generated for each of macroblocks, the plurality of pixel reduction patterns having a same reduction ratio in each of a horizontal direction and a vertical direction of the macroblock, each of a plurality of frame images included in video being divided into the macroblocks;
   performing statistical processing on motion vectors detected with respect to each of the macroblocks;
   selecting one of the plurality of reduced images of the plurality of pixel reduction patterns generated with respect to the frame image of a reference frame, based on a result of the statistical processing;
   searching, by a circuit, a first search range in the selected one of the plurality of reduced images so as to detect a first motion vector; and
   searching, by the circuit, a second search range set in the reference frame based on the first motion vector so as to detect a second motion vector, wherein
   each of the macroblocks is a pixel matrix, and
   said generating the reduced images generates the plurality of reduced images for each of the macroblocks by reducing pixels included in the pixel matrix in accordance with the plurality of pixel reduction patterns having the same reduction ratio with a plurality of set directions that differ in a ratio of a component in a first direction of arrangement and a component in a second direction of arrangement perpendicular to the first direction of arrangement, and
   said selecting selects the one of the plurality of reduced images of the plurality of pixel reduction patterns in accordance with a ratio of a first component and a second component of a statistical motion vector the statistical motion vector being obtained the result statistical processing, component being in a first direction of arrangement and the second component being in a second direction of arrangement perpendicular to the first direction of arrangement.

7. The encoding method as claimed in claim 6, wherein said generating the reduced images generates each of the plurality of reduced images by setting first lines and second lines alternately in the set direction, the first lines and second lines being perpendicular to the set direction, respectively, and eliminating every other pixel on the first lines and eliminating each of the pixels on the second lines.

8. The encoding method as claimed in claim 6, wherein said performing the statistical processing performs the statistical processing on the motion vectors of neighboring macroblocks of one of the macroblocks that is a target of processing in one of the frame images that is a target of processing.

9. The, encoding method as claimed in claim 8, wherein said performing the statistical processing performs the statistical processing on the motion vectors detected in the one of the frame images and the motion vectors detected in a reference frame subsequent to the one of the frame images.

10. The encoding method as claimed in claim 6, wherein said performing the statistical processing performs the statistical processing on the motion vectors of neighboring macroblocks of one of the macroblocks that is a target of processing in one of the frame images that is a target of processing and the motion vectors of the macroblocks in a reference region in the reference frame, the reference region including a macroblock spatially at a same position as the one of the macroblocks.

\* \* \* \* \*